United States Patent
Brun et al.

(10) Patent No.: US 9,946,233 B2
(45) Date of Patent: Apr. 17, 2018

(54) APPARATUS AND METHODS FOR PROVIDING BUILDING AUTOMATION SYSTEM DATA UPDATES TO A WEB CLIENT

(71) Applicant: SIEMENS SCHWEIZ AG, Zurich (CH)

(72) Inventors: Gerhard Brun, Lucerne (CH); Ralph Sigrist, Steinhausen (CH)

(73) Assignee: Siemens Schweiz AG, Zurich (CH)

( * ) Notice: Subject to any disclaimer, the term of this patent is extended or adjusted under 35 U.S.C. 154(b) by 250 days.

(21) Appl. No.: 14/432,255

(22) PCT Filed: Sep. 28, 2012

(86) PCT No.: PCT/EP2012/069210
§ 371 (c)(1),
(2) Date: Mar. 30, 2015

(87) PCT Pub. No.: WO2014/048491
PCT Pub. Date: Apr. 3, 2014

(65) Prior Publication Data
US 2015/0253748 A1    Sep. 10, 2015

(51) Int. Cl.
*G06F 15/173*    (2006.01)
*G05B 13/04*    (2006.01)
(Continued)

(52) U.S. Cl.
CPC .......... *G05B 13/04* (2013.01); *H04L 12/282* (2013.01); *H04L 12/2803* (2013.01);
(Continued)

(58) Field of Classification Search
CPC ........ G05B 2219/2642; H04L 12/2816; H04L 12/2803
(Continued)

(56) References Cited

U.S. PATENT DOCUMENTS 5,596,701 A * 1/1997 Augusteijn ............... G06F 9/44
715/273
5,790,416 A * 8/1998 Norton ................ G06F 17/5045
716/102

(Continued)

FOREIGN PATENT DOCUMENTS

EP    1345097 A1    9/2003

OTHER PUBLICATIONS

Corcoran, P.M., "Mapping home-network appliances to TCP/TP sockets using a three-tiered home gateway architecture", IEEE Transactions on Consumer Electronics, 1998, pp. 729-736, vol. 44, No. 3.

(Continued)

*Primary Examiner* — Duyen Doan
(74) *Attorney, Agent, or Firm* — Laurence Greenberg; Werner Stemer; Ralph Locher

(57) ABSTRACT

An apparatus and methods provide a building automation system that includes a controller, a web server and a client. The controller includes building automation objects that may be used to generate a model that includes elements, wherein each element is associated with one or more of the objects. The web server includes business logic that reads and subscribes to the objects. Each object notifies the business logic of changes to the data of the object. The business logic processes the data from the objects to provide model update commands based on the changed data. The client includes presentation logic that displays the model, receives the model update commands from the business logic, updates the model using the model update commands, and displays the updated model.

22 Claims, 19 Drawing Sheets

(51) Int. Cl.
    *H04L 29/08* (2006.01)
    *H04L 12/28* (2006.01)
    *H04L 29/06* (2006.01)

(52) U.S. Cl.
    CPC ...... *H04L 12/2814* (2013.01); *H04L 12/2818* (2013.01); *H04L 67/025* (2013.01); *H04L 67/125* (2013.01); *H04L 67/28* (2013.01); *H04L 67/34* (2013.01); *H04L 67/42* (2013.01)

(58) Field of Classification Search
    USPC .................................................. 709/223–225
    See application file for complete search history.

(56) References Cited

U.S. PATENT DOCUMENTS

| | | | | |
|---|---|---|---|---|
| 5,857,198 | A * | 1/1999 | Schmidt | G06F 17/24 707/797 |
| 6,484,234 | B1 * | 11/2002 | Kedem | G06F 3/061 711/112 |
| 2003/0176930 | A1 | 9/2003 | Nold | |
| 2004/0031061 | A1 * | 2/2004 | McCalla | A63F 13/10 725/135 |
| 2006/0058922 | A1 | 3/2006 | Kruk et al. | |
| 2010/0017739 | A1 * | 1/2010 | Han | H04L 67/025 715/772 |
| 2010/0274366 | A1 * | 10/2010 | Fata | G05B 15/02 700/7 |
| 2011/0088000 | A1 * | 4/2011 | Mackay | G06T 19/00 715/853 |
| 2011/0107281 | A1 * | 5/2011 | Sun | G06F 17/5081 716/106 |

OTHER PUBLICATIONS

Corcoran, P.M., et al., "Browser-style interfaces to a home automation network", IEEE Transactions on Consumer Electronics, 1997, pp. 1063-1069, vol. 43, No. 4.

Desbonnet, J., et al., "System architecture and implementation of a CEBus/internet gateway", IEEE Transactions on Consumer Electronics, 1997, pp. 1057-1062, vol. 43, No. 4.

* cited by examiner

APPARATUS AND METHODS FOR PROVIDING BUILDING AUTOMATION SYSTEM DATA UPDATES TO A WEB CLIENT

BACKGROUND OF THE INVENTION

Field of the Invention:

This invention relates to building automation systems. More particularly, this invention relates to apparatus and methods for providing building automation system data updates to a web client.

BRIEF SUMMARY OF THE INVENTION

In a first aspect of the invention, a building automation system is provided that includes a building automation controller, a web server, and a client. The building automation controller includes multiple building automation objects, each comprising data that may be used to generate a model that includes multiple elements, wherein each element is associated with one or more of the building automation objects. The web server includes business logic that is adapted to read and subscribe to the building automation objects, wherein each building automation object is adapted to notify the business logic of changes to the data of the building automation object, and to process the data from the building automation objects to provide model update commands based on the changed data. The client includes presentation logic adapted to display the model, receive the model update commands from the business logic, update the model using the model update commands, and display the updated model.

In a second aspect of the invention, a building automation method is provided that includes providing multiple building automation objects, a web server, and a client. Each building automation objects includes data that may be used to generate a model that has multiple elements, wherein each element is associated with one or more of the building automation objects. The web server includes business logic that is adapted to read and subscribe to the building automation objects, wherein each building automation object is adapted to notify the business logic of changes to the data of the building automation object, and to process the data from the building automation objects to provide model update commands based on the changed data. The client includes presentation logic adapted to display the model, receive the model update commands from the business logic, update the model using the model update commands, and display the updated model.

Other features and aspects of the present invention will become more fully apparent from the following detailed description, the appended claims and the accompanying drawings.

BRIEF DESCRIPTION OF THE SEVERAL VIEWS OF THE DRAWING DRAWING

Features of the present invention can be more clearly understood from the following detailed description considered in conjunction with the following drawings, in which the same reference numerals denote the same elements throughout, and in which.

DESCRIPTION OF THE INVENTION

Referring now to FIG. 1, a previously known building automation system 10 is described. Building automation system 10 includes a building automation controller 12, a web server 14, and one or more clients $16_1$, $16_2$, ... $16_M$. Building automation controller 12 may include one or more computers that include building management control software that obtains data from physical elements of a building control system, such as sensors and actuators (not shown) to control building systems, such as heating ventilation and air conditioning ("HVAC"), lighting, security and fire safety systems.

To provide such control, building automation controller 12 typically includes a building automation model 18 that includes one or more building automation objects $20_1$, $20_2$, ... $20_N$ that represent corresponding physical elements of the building control system, and are used to exchange data with the corresponding physical elements. For example, object $20_1$ may represent a temperature sensor, and may include data indicating the temperature of a room in which the temperature sensor is located, whereas object $20_2$ may represent a lighting control switch, and may include data indicating whether one or more light fixtures controlled by the control switch are ON or OFF.

Clients $16_1$, $16_2$, ... $16_M$ are coupled to building automation controller 12 via web server 14, and are used to communicate building automation data to users. To minimize costs, clients $16_1$, $16_2$, ... $16_M$ typically are "thin clients" that include minimal processing capabilities. Each client $16_1$, $16_2$, ... $16_M$ typically includes software (referred to herein as "presentation logic") that receives data regarding the building automation system (referred to herein as a "model") from web server 14, and renders the model on a display device, such as a liquid crystal, or light emitting diode ("LED") touch screen display.

Figure 1A:
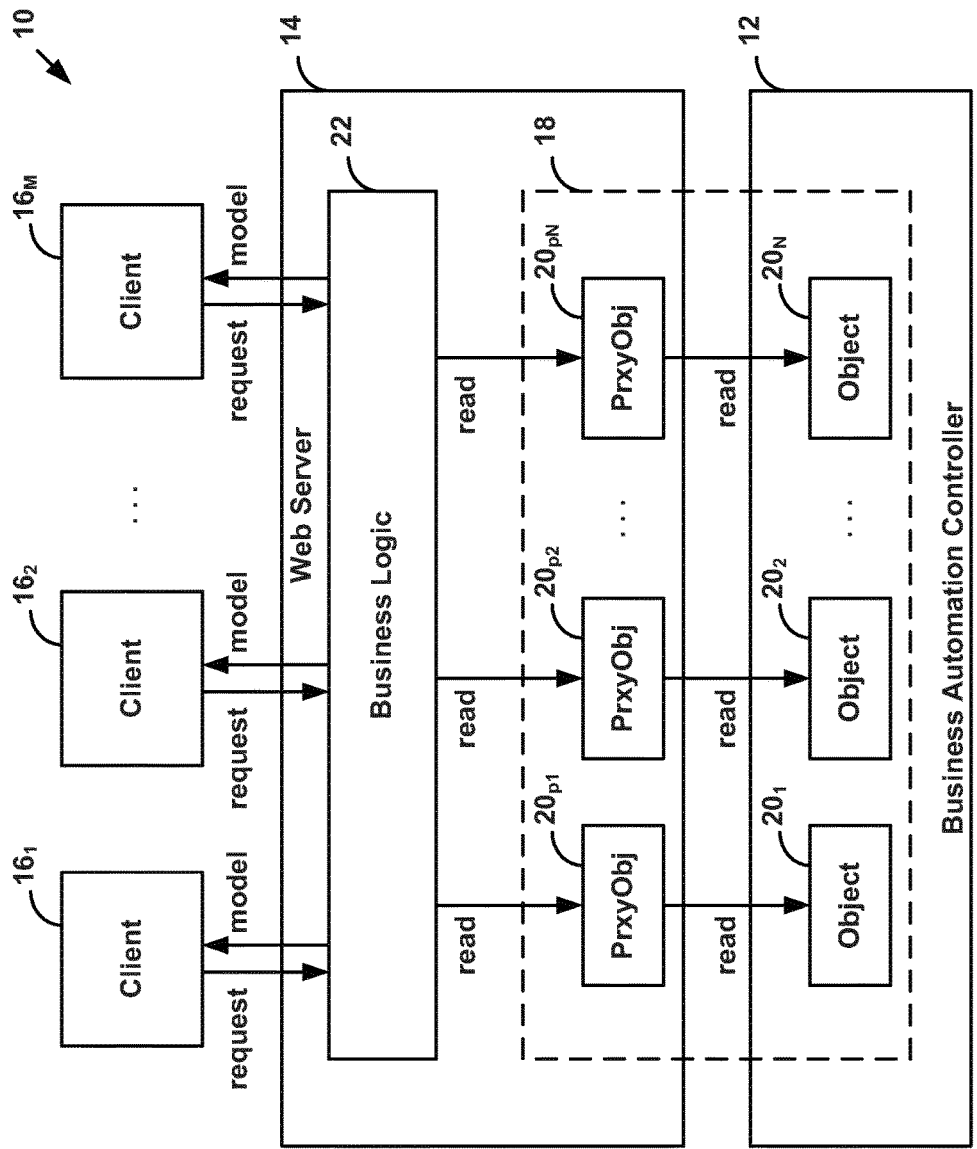
FIG. 1A is a block diagram of a previously known building automation control system.
Figure 1C:
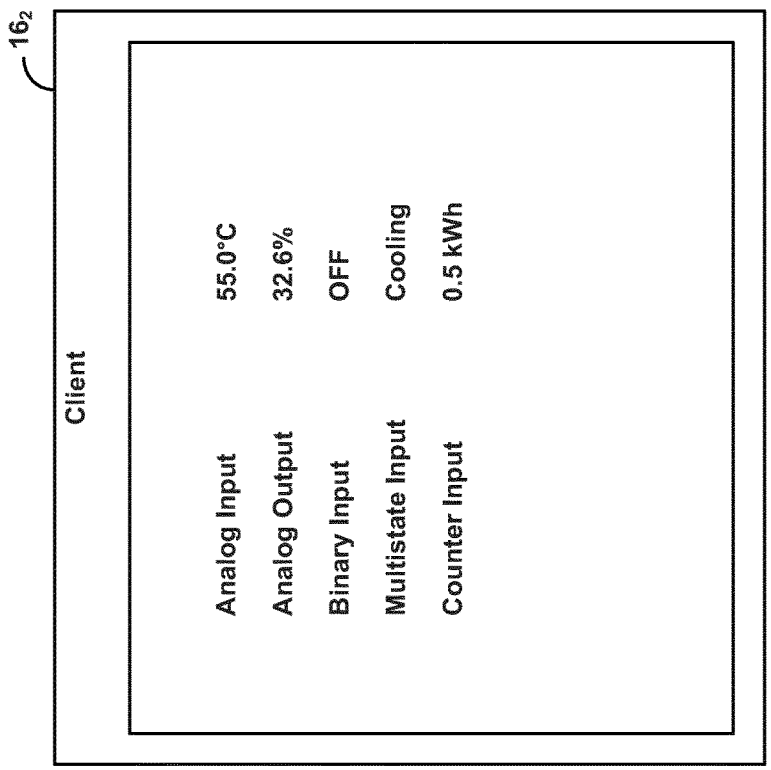
FIGS. 1B-1C are diagrams of example client terminal display screens of the previously known building automation control system of FIG. 1A.
Figure 1B:
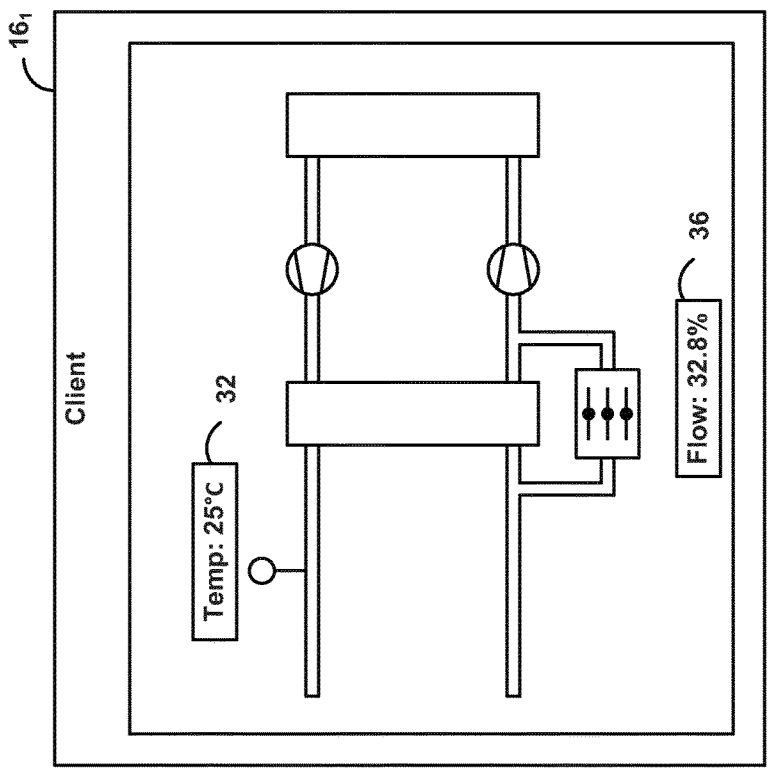

Each client $16_1$, $16_2$, ... $16_M$ typically receives and displays a unique model. For example, as shown in FIG. 1B, client $16_1$ may display a first model that illustrates building parameters of a first building, whereas as shown in FIG. 1C, client $16_2$ may display a second model that illustrates building parameters of a second building, and so on. In addition, the format used to display the model on a client $16_1$, $16_2$, ... $16_M$ may be modified based on user input. For example, a user may view a model in a graphical layout format (such as shown in FIG. 1B), and subsequently may enter a command to view the data in a list format (such as in FIG. 1C).

Referring again to FIG. 1A, to provide the various models to clients $16_1$, $16_2$, ... $16_M$, web server 14 includes business logic 22 that accesses objects $20_1$, $20_2$, ... $20_N$, processes the data from the objects to form the models, and provides the models to clients $16_1$, $16_2$, ... $16_M$ via a communication protocol, such as HTTP, PL-Link or other similar communication protocol.

Web server 14 may be implemented on building automation controller 12 and may directly access objects $20_1$, $20_2$, ... $20_N$. Alternatively, as shown in FIG. 1A, web server 14 may be hosted separately from building automation controller 12, and may access objects $20_1$, $20_2$, ... $20_N$ (referred to in such an implementation as "remote objects") indirectly via proxy objects $20_{p1}$, $20_{p2}$, ... $20_{pN}$. Each proxy object $20_{p1}$, $20_{p2}$, ... $20_{pN}$ is associated with a corresponding remote object $20_1$, $20_2$, ... $20_N$, and has data that replicates data of the corresponding remote object. In addition, the data of a proxy object $20_{p1}$, $20_{p2}$, ... $20_{pN}$ is updated when the data of the corresponding remote object $20_1$, $20_2$, ... $20_N$ changes value.

To reflect changes in model data over time, clients $16_1$, $16_2$, ... $16_M$ periodically request model updates from web server 14. For example, once per second, each of clients $16_1$, $16_2$, ... $16_M$ may issue a request command to web server 14, which requires web server 14 to process N objects $20_1$, $20_2$, ... $20_N$ to form M models, and communicate the new model data in parallel to M clients $16_1$, $16_2$, ... $16_M$. To provide such a large amount of data each second, previously known web server 14 requires a significant amount of processing power and memory.

Although the data displayed on each of clients $16_1$, $16_2$, ... $16_M$ changes over time, not all displayed model data changes at each request interval, and not all model data changes at the same time. For example, in FIG. 1B, the temperature 32 may change very slowly over time, and the flow rate 36 typically changes at different times than changes in temperature 32.

Nevertheless, referring again to FIG. 1A, clients $16_1$, $16_2$, ... $16_M$ periodically request model updates from web server 14, which processes and provides new model data to clients $16_1$, $16_2$, ... $16_M$, even though all or much of the model data remains unchanged. Thus, the processing power required by web server 14 to periodically provide such model data is inefficiently used in such previously known building automation systems. In addition, if web server 14 communicates with one or more of clients $16_1$, $16_2$, ... $16_M$ via a relatively slow communication protocol (e.g., PL-Link), the time required for web server 14 to provide the entire model update to clients $16_1$, $16_2$, ... $16_M$ may exceed the periodic request interval.

Apparatus and methods in accordance with this invention seek to avoid the problems associated with previously known building automation system. As described in more detail below, apparatus and methods in accordance with this invention provide building automation systems that include a building automation controller, a web server, and one or more clients. The building automation controller includes building automation objects, and the web server includes business logic that accesses the object data, and processes the data to provide a model to each client, which displays the model on a display device. Each model includes multiple elements, and each element is associated with one or more of the objects.

The business logic implements an observer pattern to notify the business logic of any changes in the data values of the objects. In response to a notification of a change in object data, the business logic determines which associated model elements must be updated as a result of the changed data. The clients periodically issue read commands to the business logic. In response to a read command from a client, the business logic determines if any element of the model displayed by the client must be updated, and provides model update commands to the client only for the model elements that require updating. If no element of the model requires updating, the business logic does not provide any model data to the client. If a client receives model update commands from the business logic, the client implements the model update commands to modify the elements of the model that require updating, and displays the modified model.

Figure 2:
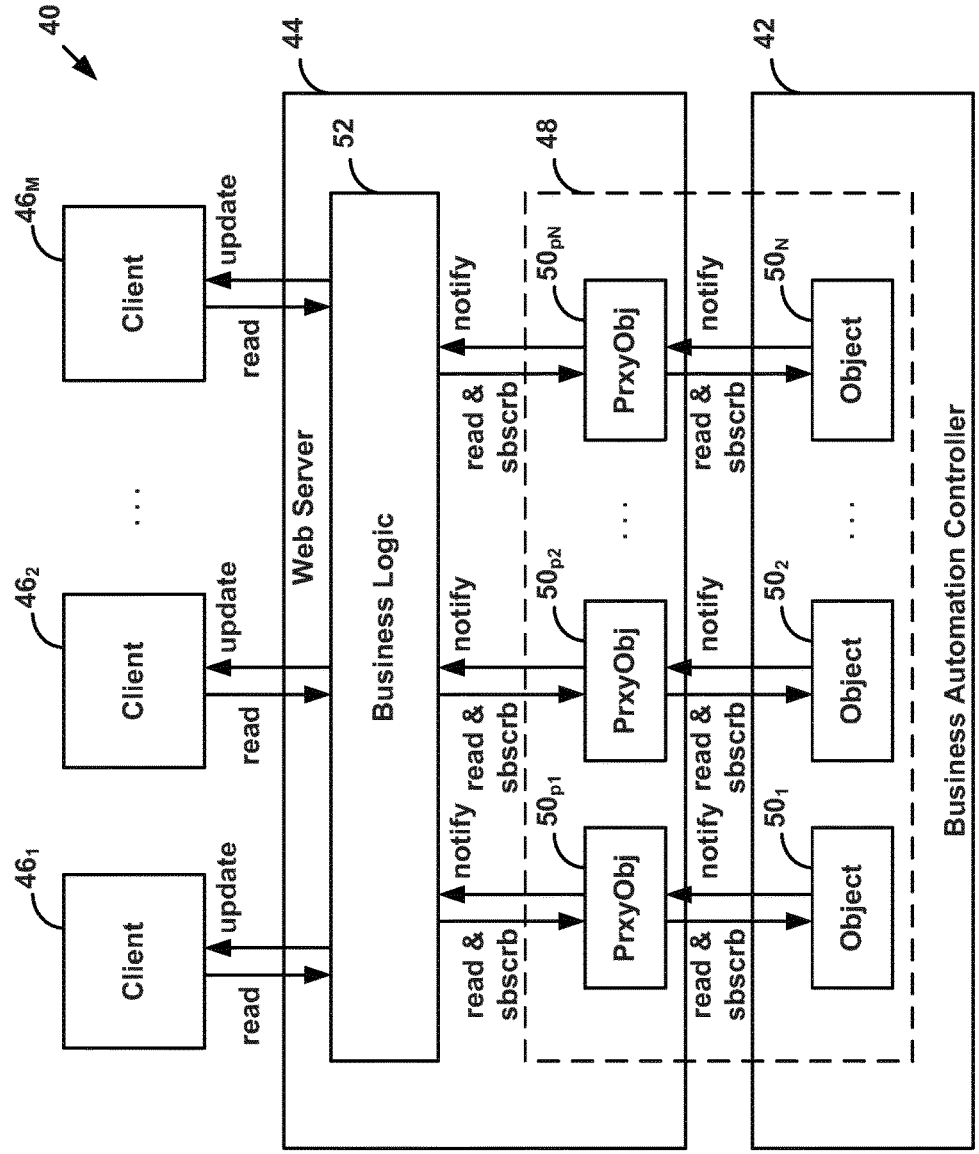
FIG. 2 is a block diagram of an example building automation control system in accordance with this invention.

Referring now to FIG. 2, an example building automation system 40 in accordance with this invention is described. Building automation system 40 includes a building automation controller 42, a web server 44, and one or more clients $46_1$, $46_2$, ... $46_g$. Building automation controller 42 may include one or more computers that include building management control software that obtains data from physical elements of a building control system, such as sensors and actuators (not shown) to control building systems, such as HVAC, lighting, security and fire safety systems, and/or other similar building control systems. For example, building automation controller 42 may be a Desigo™ PXC3 controller, by Siemens Aktiengesellschaft, Munich, Germany, or may be some other similar building automation controller.

Building automation controller 42 includes a building automation model 48 that includes one or more building automation objects $50_1$, $50_2$, ... $50_N$ that represent corresponding physical elements of the building control system, and are used to exchange data with the corresponding physical elements. For example, object $50_1$ may represent a temperature sensor, and may include data indicating the temperature of a room in which the temperature sensor is located, whereas object $50_2$ may represent a lighting control switch, and may include data indicating whether one or more light fixtures controlled by the control switch are ON or OFF.

Clients $46_1$, $46_2$, ... $46_M$ are coupled to building automation controller 42 via web server 44, and are used to communicate building automation data to users. Clients $46_1$, $46_2$, ... $46_M$ may be personal computers, laptop computers, handheld computers, smartphones, remote operator terminals, or other similar client device. For example, one or more of clients $46_1$, $46_2$, ... $46_M$ may be the Simatic Thin Clients by Siemens Aktiengesellschaft, Munich Germany. As described in more detail below, each client $46_1$, $46_2$, ... $46_M$ includes presentation logic that receives data regarding a building automation model from web server 44, and renders the model on a display device, such as a liquid crystal touchscreen display (not shown in FIG. 2).

Each client $46_1$, $46_2$, ... $46_M$ typically receives and displays a unique model. In other words, client $46_1$ may display a first model, client $46_2$ may display a second model, and so on, with no two clients displaying the same model. Persons of ordinary skill in the art will understand, however, that more than one client $46_1$, $46_2$, ... $46_M$ may display the same model.

The model displayed on a client $46_1$, $46_2$, ... $46_M$, and the format used to display the model may be selected by user input. For example, a user may view a model in a graphical layout format, and subsequently may enter a command to view the model in a list format, or other similar format.

In addition, one or more of clients $46_1$, $46_2$, ... $46_M$ may receive inputs from users to control or modify aspects of building automation system 40. For example, a user may enter a command on a client $46_1$ to change a specified temperature, control a light switch, open or close a damper, or other similar command to change a building automation system parameter.

Web server 44 includes business logic 52 that accesses remote objects $50_1, 50_2, \ldots 50_N$, processes the data from the objects to form the models, and provides the models to clients $46_1, 46_2, \ldots 46_M$ via a communication protocol, such as HTTP, PL-Link or other similar communication protocol. In addition, in response to periodic read requests from clients $46_1, 46_2, \ldots 46_M$, web server 44 provides model updates to clients $46_1, 46_2, \ldots 46_M$ for portions of the models that have changed data, if any. Persons of ordinary skill in the art will understand that web server 44 may include elements other than and/or in addition to the elements illustrated in FIG. 2.

Web server 44 may be implemented on building automation controller 42 and may directly access remote objects $50_1, 50_2, \ldots 50_N$. Alternatively, as shown in FIG. 2, web server 44 may be hosted separately from building automation controller 42, and may access remote objects $50_1, 50_2, \ldots 50_N$ indirectly via proxy objects $50_{p1}, 50_{p2}, \ldots 50_{pN}$. Each proxy object $50_{p1}, 50_{p2}, \ldots 50_{pN}$ is associated with a corresponding remote object $50_1, 50_2, \ldots 50_N$, and has data that replicates data of the corresponding remote object. In addition, the data of a proxy object $50_{p1}, 50_{p2}, \ldots 50_{pN}$ is updated when the data of the corresponding remote object $50_1, 50_2, \ldots 50_N$ changes value.

In accordance with this invention, web server 44 implements an observer pattern to notify business logic 52 of any changes in the data values of proxy objects $50_{p1}, 50_{p2}, \ldots 50_{pN}$ and remote objects $50_1, 50_2, \ldots 50_N$. In particular, business logic 52 issues commands to read and subscribe to each of proxy objects $50_{p1}, 50_{p2}, \ldots 50_{pN}$, each of which in turn issues commands to read and subscribe to each of corresponding remote objects $50_1, 50_2, \ldots 50_N$.

To reflect changes in model data over time, each of clients $46_1, 46_2, \ldots 46_M$ periodically requests model updates from web server 44. In particular, in accordance with this invention, each of clients $46_1, 46_2, \ldots 46_M$ periodically issues a read command to business logic 52. For example, each of clients $46_1, 46_2, \ldots 46_M$ may issue a read command once per second, or at some other time interval. Persons of ordinary skill in the art will understand that clients $46_1, 46_2, \ldots 46_M$ may issue read requests at the same time or at different times, and at the same rate or at different rates.

As described in more detail below, in response to receiving a read command from a client $46_i$, business logic 52 determines if any portion of the model displayed by client $46_i$ has changed. If no portion of the model has changed, business logic 52 does not provide any model data to client $46_i$. If, however, one or more portions of the model have changed, business logic 52 provides model update instructions to client $46_i$, but only for the changed portions of the model.

For example, if remote object $50_1$ and corresponding proxy object $50_{p1}$ notify business logic 52 of a changed value, that change may affect a portion of a model displayed by client 46i. Business logic 52 determines the affected portion of the model, reads the changed values of remote object $50_1$ and corresponding proxy object $50_{p1}$, provides model update instructions to client $46_i$ only for the changed portions, client $46_i$ processes the model update instructions to update the model, and then renders the updated model on a display device.

Under certain conditions, business logic 52 may transfer the entire model to client $46_i$. For example, in response to an out of sync condition between client 46i and web server 44, a server reboot, a client reboot, or some other condition, business logic 52 may transfer the entire model to client $46_i$.

Figure 3:
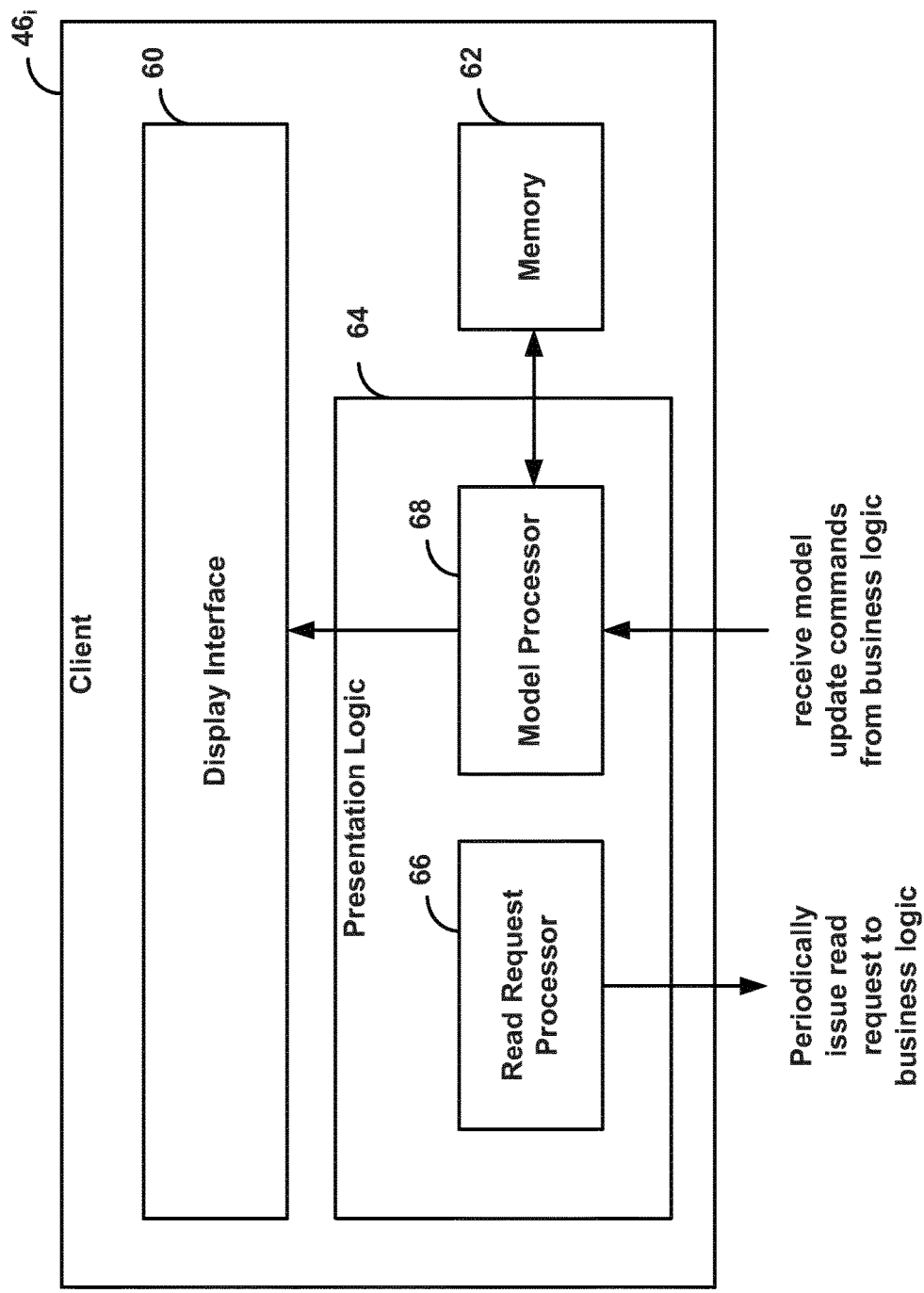
FIG. 3 is a block diagram of elements of an example client terminal in accordance with this invention.

Referring now to FIG. 3, an example client $46_i$ is described. Client $46_i$ includes a display interface 60, a memory 62 and presentation logic 64. Display interface 60 may include hardware and/or software used to generate graphical data on a display device (not shown in FIG. 3), such as a liquid crystal display, light emitting diode LED display, or other similar display device. Memory 62 may be any conventional memory, such as a hard drive, floppy drive, optical memory, flash memory, or other similar computer memory. Memory 62 is used to store a current version of a model displayed on the display device. Persons of ordinary skill in the art will understand that client $46_i$ may include elements other than and/or in addition to the elements illustrated in FIG. 3.

Presentation logic 64 includes a read request processor 66 and a model processor 68. Read request processor periodically issues read requests to business logic 52 to obtain changes in model data. Model processor 68 receives model update commands from business logic 52. In response to such model update commands, model processor 68 retrieves the current model from memory 62, processes the model update instructions to update the current model, replaces the current model in memory 62 with the updated model, and renders the updated model to display interface 60. Persons of ordinary skill in the art will understand that presentation logic 64 may include elements other than and/or in addition to the elements illustrated in FIG. 3.

Figure 4:
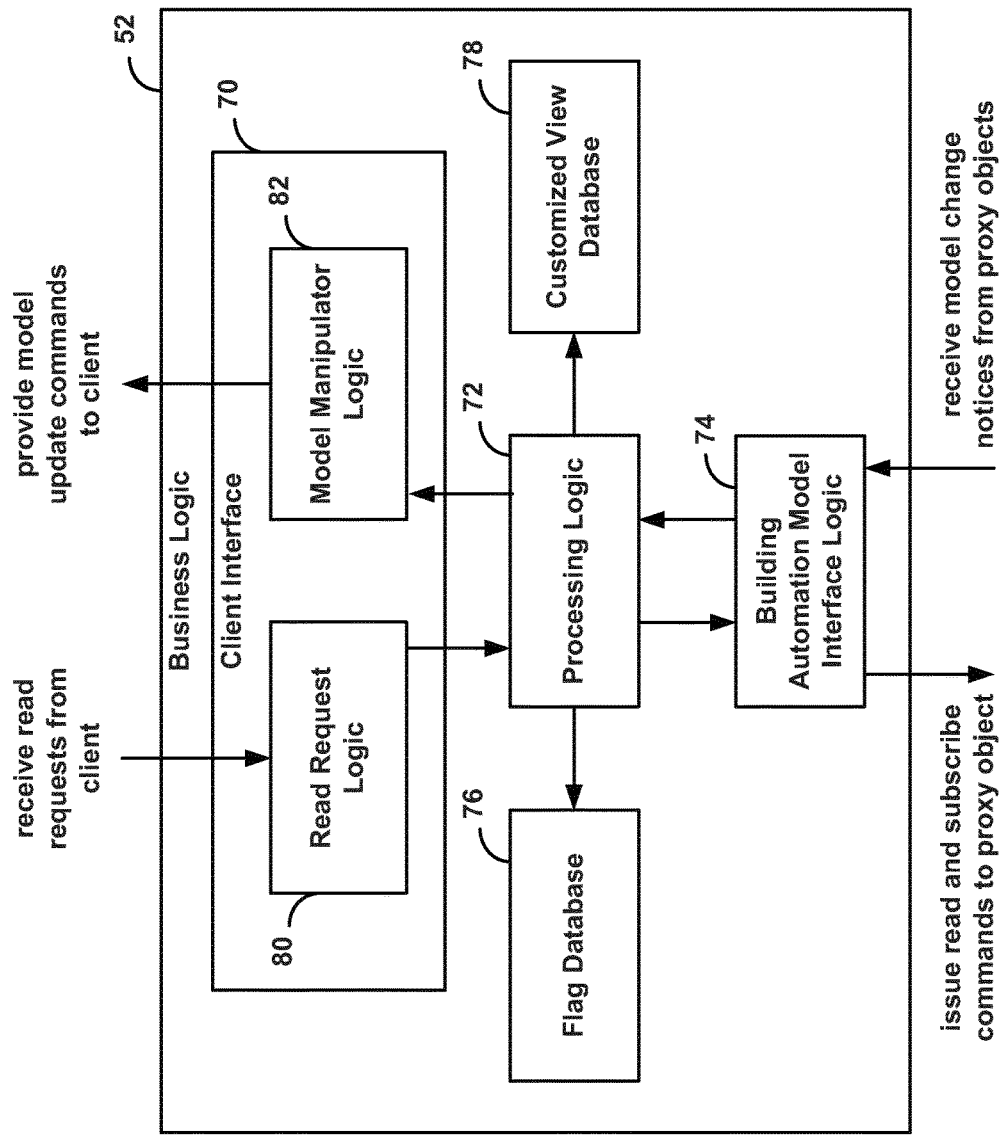
FIG. 4 is a block diagram of example elements of business logic in accordance with this invention.

Referring now to FIG. 4, example business logic 52 is described. Business logic includes client interface 70, processing logic 72, building automation model interface logic 74, flag database 76 and customized view database 78. Client interface 70 includes read request logic 80 and model manipulator logic 82. Persons of ordinary skill in the art will understand that business logic 52 and client interface 70 each may include elements other than and/or in addition to the elements illustrated in FIG. 4, and that one or more elements may be combined.

Building automation model interface logic 74 issues read and subscribe commands to proxy objects $50_{p1}, 50_{p2}, \ldots 50_{pN}$ in response to commands from processing logic 72, receives model change notifications from proxy objects $50_{p1}, 50_{p2}, \ldots 50_{pN}$, and provides received model change notifications to processing logic 72. For simplicity, the remaining discussion refers only to proxy objects $50_{p1}, 50_{p2}, \ldots 50_{pN}$. Persons of ordinary skill in the art will understand that building automation model interface logic 74 may issue read and subscribe commands to, and receive model change notifications directly from remote objects $50_1, 50_2, \ldots 50_N$ if remote objects are hosted on web server 44.

Customized view database 78 describes how model data are to be displayed on each of clients $46_1, 46_2, \ldots 46_M$. As described in more detail below, processing logic 72 accesses customized view database 78 to generate model update commands, and provides the model update commands to clients $46_1, 46_2, \ldots 46_M$ via model manipulator logic 82.

In addition, processing logic 72 maintains flag database 76, which includes one or more flags, with each flag corresponding to a model element. Model elements may include graphic pages, graphic elements (e.g., widgets) within a graphic page, and other similar model elements. Each model element may include or be based on data from one or more associated proxy objects $50_{p1}, 50_{p2}, \ldots 50_{pN}$. Table 1, below, illustrates an example relationship between flags, associated proxy objects $50_{p1}, 50_{p2}, \ldots 50_{pN}$, corresponding model elements, and clients $46_1, 46_2, \ldots 46_M$:

TABLE 1

| Flag | Value | Model Element | Objects | Clients |
|---|---|---|---|---|
| F1 | Green | Element 1 | $50_{p1}$, $50_{p8}$, $50_{p12}$ | $46_2$, $46_7$ |
| F2 | Red | Element 2 | $50_{p5}$, $50_{p9}$ | $46_1$, $46_3$, $46_{11}$ |
| F3 | Green | Element 3 | $50_{p2}$, $50_{p8}$, $50_{p33}$, $50_{p40}$ | $46_9$ |

In the illustrated example, flag F1 corresponds to model element "Element 1," which is based on associated proxy objects $50_{p1}$, $50_{p8}$, $50_{p12}$, and is displayed on clients $46_2$ and $46_7$. As the illustrated example shows, data from a single proxy object may be used in more than one model element, and may affect model elements that are displayed on more than one client. For example, in Table 1, proxy objects $50_{p8}$ is used in model element Element 1 and model element "Element 3."

Each flag has a first value (e.g., "1," "TRUE," a first color, or some other value) and a second value (e.g., "0," "FALSE," a second color, or some other value) that indicates whether the corresponding model element has changed. For example, at a first time instant, flag F1 may have the first value (e.g., green) that indicates that corresponding model element Element 1 has not changed. At a subsequent time instant, flag F1 may have the second value (e.g., red) that indicates that corresponding model element Element 1 has changed and must be regenerated.

Processing logic 72 maintains flag database 76 based on model change notifications received via building automation model interface logic 74 from proxy objects $50_{p1}$, $50_{p2}$, . . . $50_{pN}$. In particular, if processing logic 72 receives a model change notification indicating that one or more proxy objects $50_{p1}$, $50_{p8}$, $50_{p12}$ has a changed value, processing logic 72 determines the model element(s) associated with the changed proxy objects, and changes the corresponding flag(s) from the first value to the second value.

For example, if processing logic 72 receives a model change notification indicating that proxy object $50_{p2}$ has a changed value, processing logic 72 changes corresponding flag F3 from the first value to the second value. Likewise, if processing logic 72 receives a model change notification indicating that proxy object $50_{p8}$ has a changed value, processing logic 72 changes corresponding flags F1 and F3 from the first value to the second value.

Read request logic 80 receives periodic read commands from clients $46_1$, $46_2$, . . . $46_M$, and provides the periodic read commands to processing logic 72. In response to a read command from a client $46_i$, processing logic 72 determines which model elements are displayed by client $46_i$, and checks the corresponding flag for each model element. If all corresponding flags have the first value (e.g., green), the model data on client $46_i$ are up-to-date, and processing logic 72 does not need to provide any model data to client $46_i$.

If, however, a flag for a corresponding model element displayed by client $46_i$ has the second value (e.g., red), processing logic 72 reads the values of the proxy object(s) associated with the flag, accesses customized view database 78 to generate model update commands for the corresponding model element, and provides the model update commands to client $46_i$ via model manipulator logic 82. Processing logic 72 generates model update commands only for model elements whose corresponding flag has the second value.

Thus, in the example illustrated above in Table 1, in response to a read request from a client $46_3$, processing logic 72 determines that model element "Element 2" is displayed by client $46_3$, and that corresponding flag F2 is red. Accordingly, processing logic 72 reads the values of proxy objects $46_1$, $46_3$, $46_{11}$ associated with Element 2, accesses customized view database 78 to generate model update commands for Element 2, and provides the model update commands to client $46_3$ via model manipulator logic 82.

In response to such model update commands, model processor 68 of client $46_3$ retrieves the current model from memory 62, processes the model update instructions to update the current model, replaces the current model in memory 62 with the updated model, and renders the updated model to display interface 60 of client $46_3$.

Figure 5A:
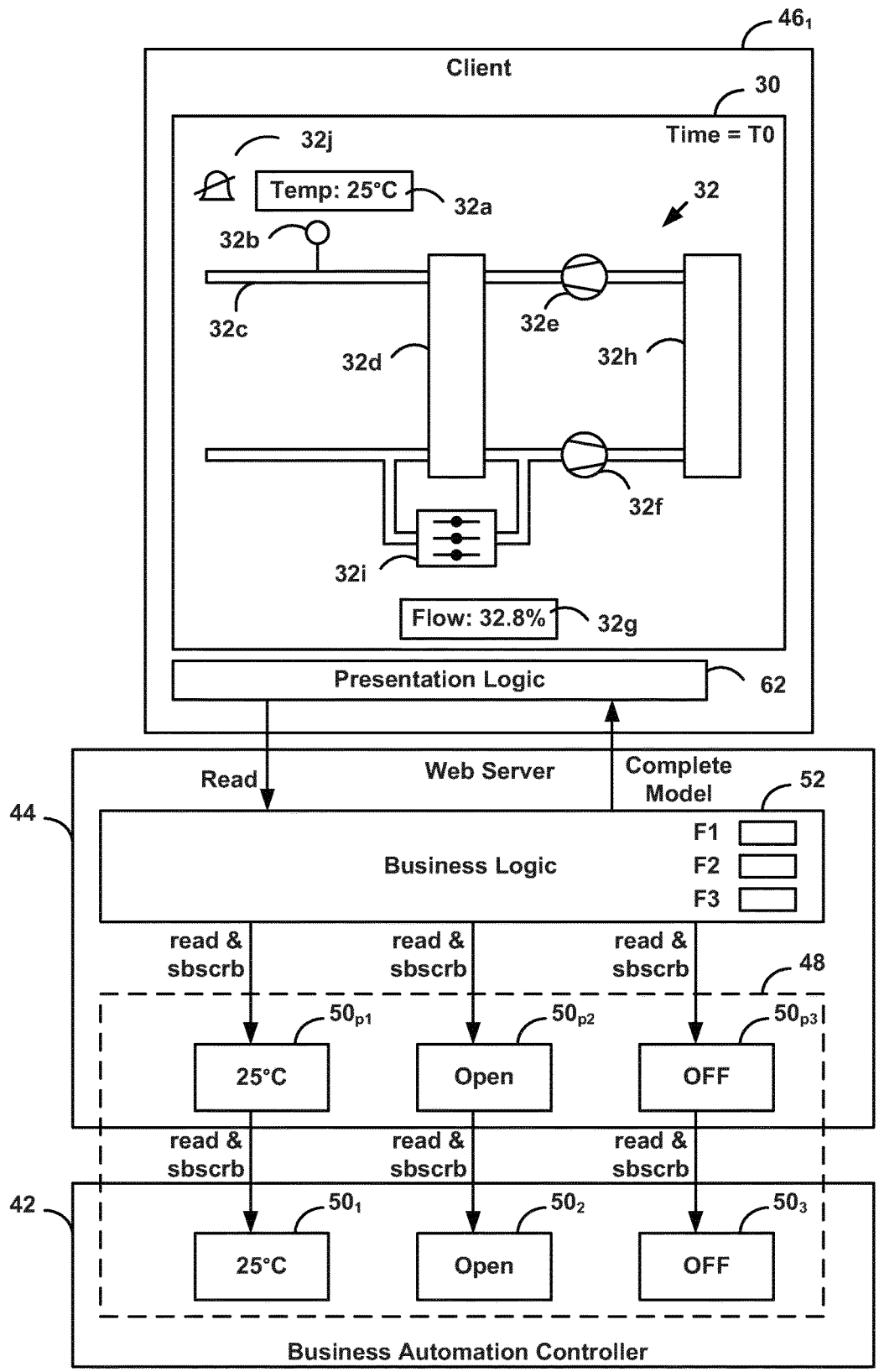
FIGS. 5A-5K are diagrams of elements of an example web server and corresponding client terminal display screens in accordance with this invention.

Referring now to FIGS. 5A-5K, an example operation of building automation system 40 is described. To simplify the discussion, FIG. 5A illustrates building automation controller 42 and web server 44 coupled to a single client $46_1$. Building automation model 48 includes three objects, including remote objects $50_1$, $50_2$ and $50_3$, and three corresponding proxy objects $50_{p1}$, $50_{p2}$ and $50_{p3}$, respectively. Once again, for simplicity, the remaining discussion will refer only to proxy objects $50_{p1}$, $50_{p2}$ and $50_{p3}$. In addition, business logic 52 includes three flags F1, F2 and F3.

Client $46_1$ includes a display device 30 that displays a model 32 depicted as a graphical representation of a building HVAC system. Model 32 includes various elements 32a-32i of the HVAC system, including a display of a temperature 32a measured by a temperature sensor 32b located inside an air duct 32c that is coupled to a first heat exchanger 32d, which in turn is coupled via a first valve 32e and a second valve 32f to a second heat exchanger 32h, and a display of flow rate 32g of a bypass damper 32i.

Proxy objects $50_{p1}$, $50_{p2}$ and $50_{p3}$ represent temperature sensor 32b, first valve 32e and a temperature alarm 32j. In FIG. 5A, at time T0, proxy object $50_{p1}$ includes data indicating that the temperature measured by temperature sensor 32b is 25° C., proxy object $50_{p2}$ includes data indicating that first valve 32e is Open, and proxy object $50_{p3}$ includes data indicating that alarm 32j is OFF. Flags F1, F2 and F3 corresponds to model elements 32a, 32e and 32j, respectively. In FIG. 5A, flags F1, F2 and F3 each have a first value (e.g., the color green, illustrated in FIG. 5A as white).

Table 2, below, illustrates the relationship between flags F1-F3, associated proxy objects $50_{p1}$, $50_{p2}$ and $50_{p3}$, and corresponding model elements 32a, 32e and 32j:

TABLE 2

| Flag | Model Element | Objects |
|---|---|---|
| F1 | 32a | $50_{p1}$ |
| F2 | 32e | $50_{p2}$ |
| F3 | 32j | $50_{p3}$ |

Persons of ordinary skill in the art will understand that flags typically do not correspond to individual proxy objects, and individual proxy objects typically are not associated with individual model elements.

As shown in FIG. 5A, at time T0, presentation logic 62 issues a read command to business logic 52, which in turn issues read and subscribe commands to proxy objects $50_{p1}$, $50_{p2}$ and $50_{p3}$. If client $46_1$ previously included no model data (e.g., had been rebooted), lost sync with web server 44, or web server 44 had been rebooted, business logic 52 provides complete model data to presentation logic 62, which renders model 32 on display device 30.

Figure 5B:
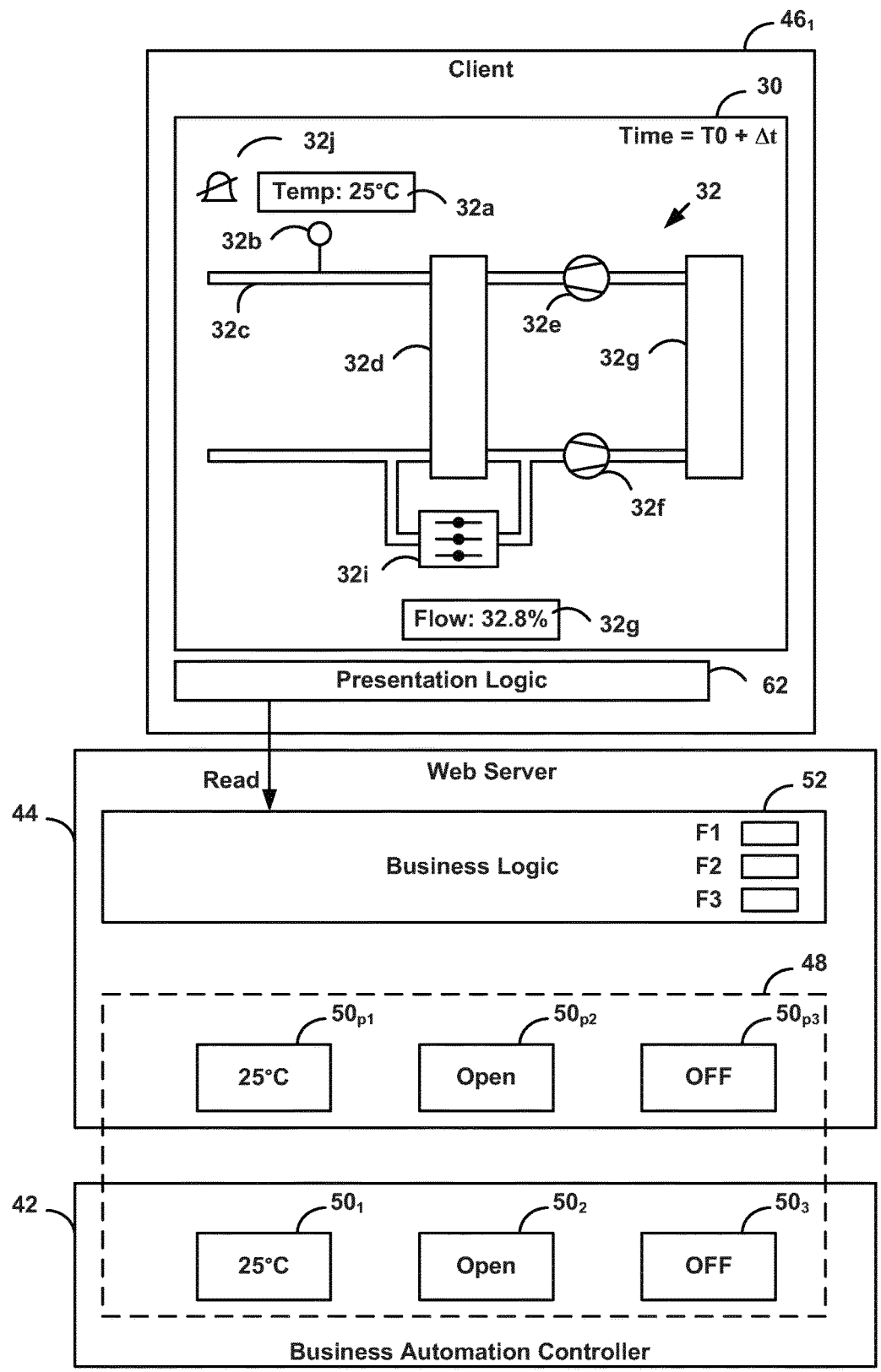

After displaying model 32, presentation logic 62 periodically issues read commands to at time intervals Δt to business logic 52. As shown in FIG. 5B, at time $T0+\Delta t$, proxy objects $50_{p1}$, $50_{p2}$ and $50_{p3}$ have not changed from the values they had at time T0, and flags F1-F3 each have the first value. Thus, in response to the read request from presentation logic 62, business logic 52 checks flags F1-F3. Because F1-F3 all have the first value, the model data on client $46_1$ are up-to-date, and business logic 52 does not need to provide any model data to client $46_1$.

Figure 5C:
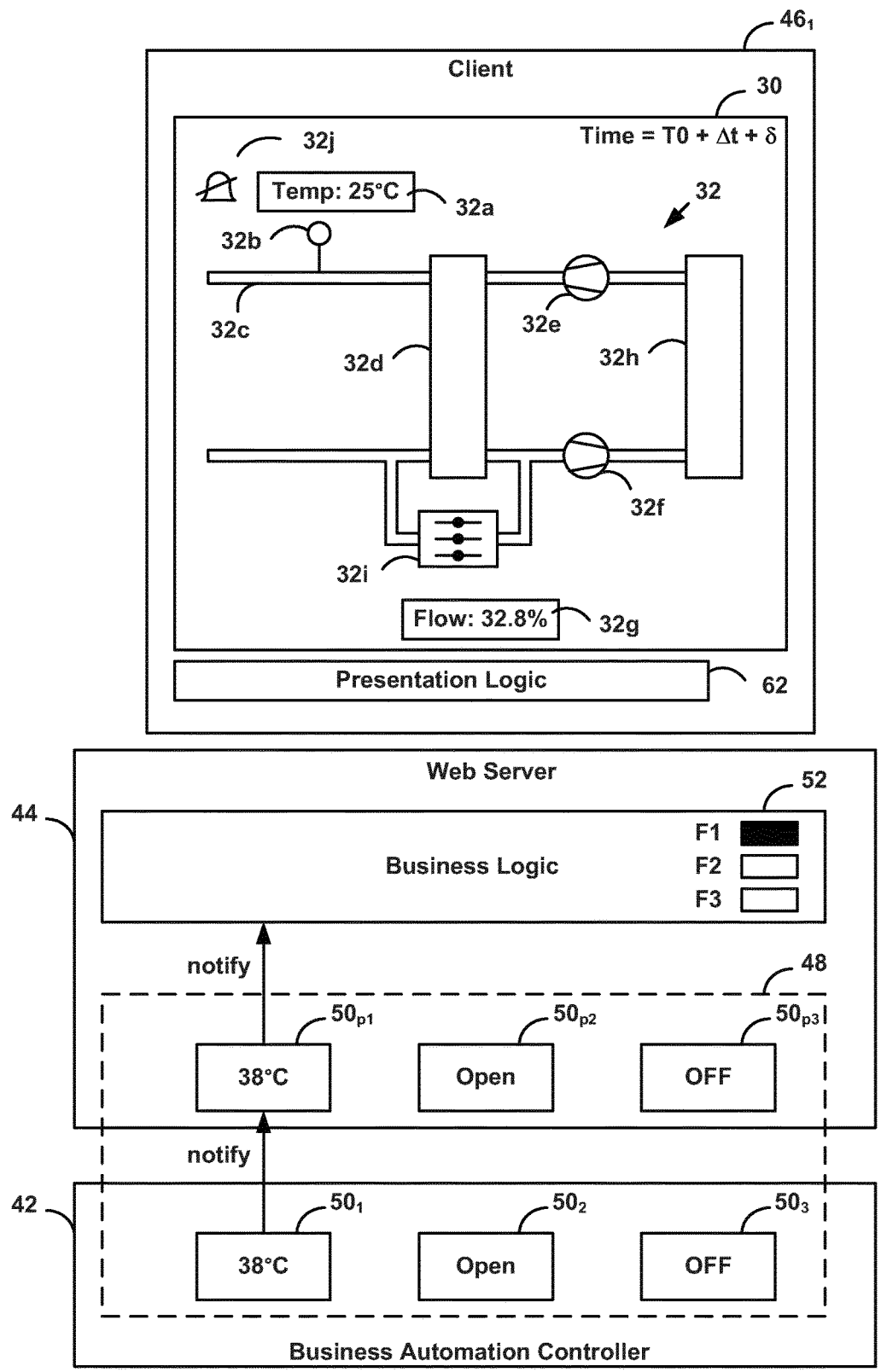

As shown in FIG. 5C, at time $T0+\Delta t+\delta$, where $\delta<\Delta t$, proxy object $50_{p1}$ changes from 25° C. to 38° C., and proxy objects $50_{p2}$ and $50_{p3}$ remain unchanged from the values they had at time $T0+\Delta t$. Proxy object $50_{p1}$ provides a model change notification to business logic 52, which changes corresponding flag F1 from the first value to the second value (e.g., the color red, illustrated in FIG. 5C as black).

Figure 5D:
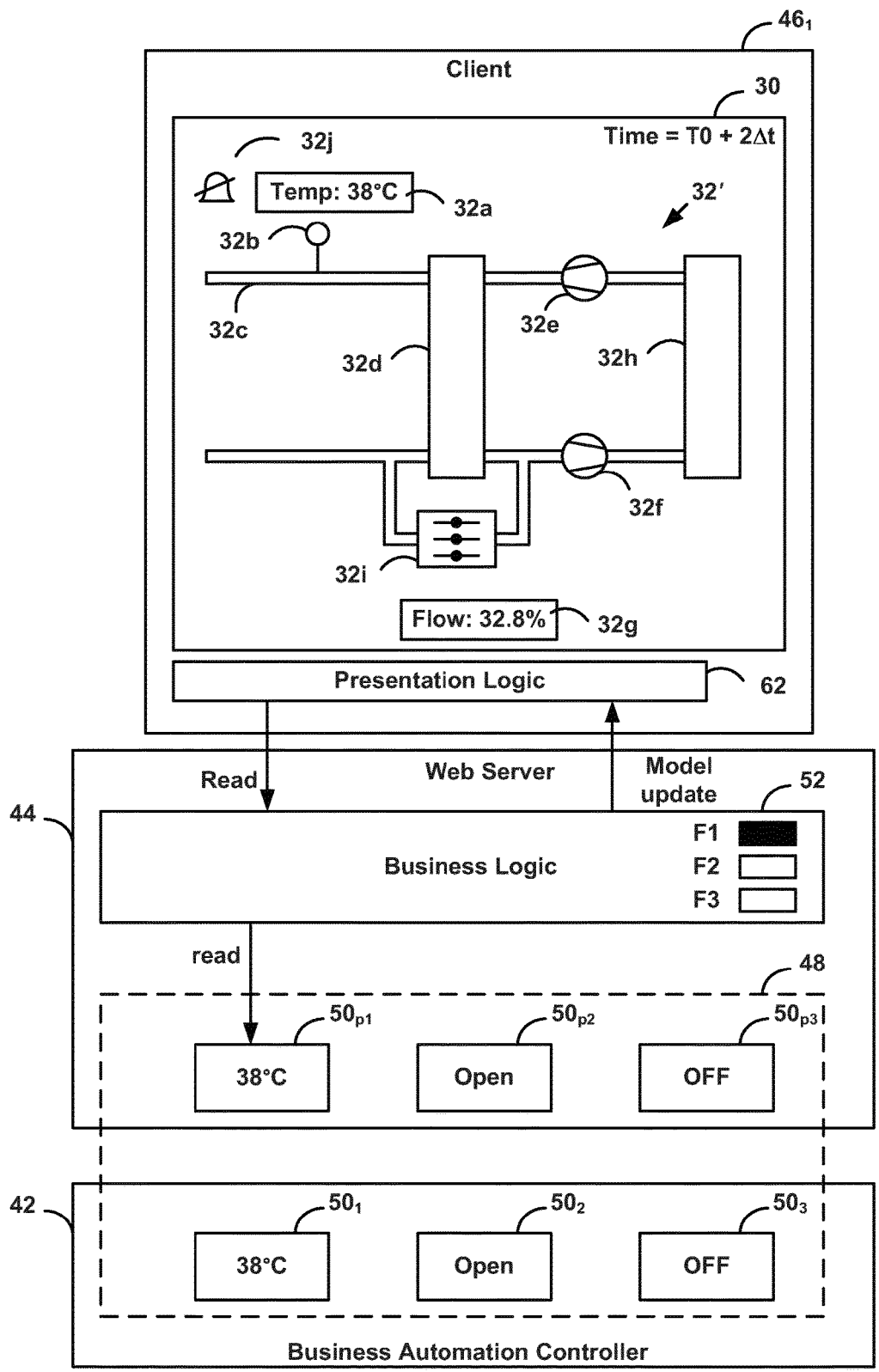

As shown in FIG. 5D, at time $T0+2\Delta t$, in response to a read command from presentation logic 62, business logic 52 checks flags F1-F3. Because flag F1 has the second value, and flags F2-F3 have the first value, business logic 52 determines that a portion of the model data on client $46_1$ is no longer up-to-date.

Business logic 52 determines that model element 32a corresponds to flag F1, reads the changed values of associated proxy object $50_{p1}$, provides model update instructions to presentation logic 62 only for the changed portions, presentation logic 62 processes the model update instructions to update model 32 to model 32', and then renders the updated model 32' on display device 30. In addition, business logic changes flag F1 from the second value to the first value.

Figure 5E:
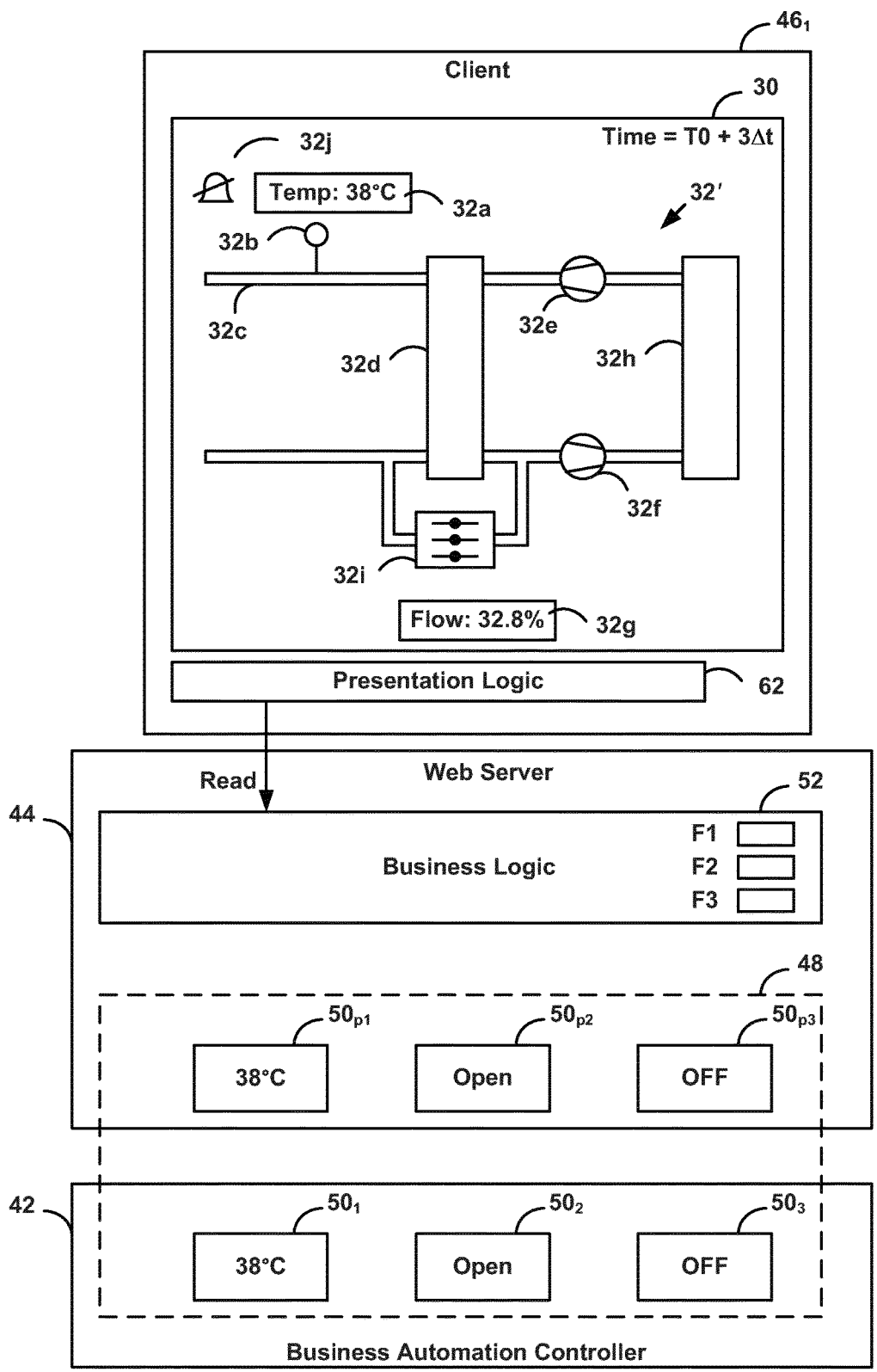

As shown in FIG. 5E, at time $T0+3\Delta t$, proxy objects $50_{p1}$, $50_{p2}$ and $50_{p3}$ have not changed from the values they had at time $T0+2\Delta t$, and flags F1-F3 each have the first value. Thus, in response to a read command from presentation logic 62, business logic 52 checks flags F1-F3.

Because F1-F3 all have the first value, the model data on client $46_1$ are up-to-date, and business logic 52 does not need to provide any model data to client $46_1$. Client $46_1$ continues to display model 32'.

Figure 5F:
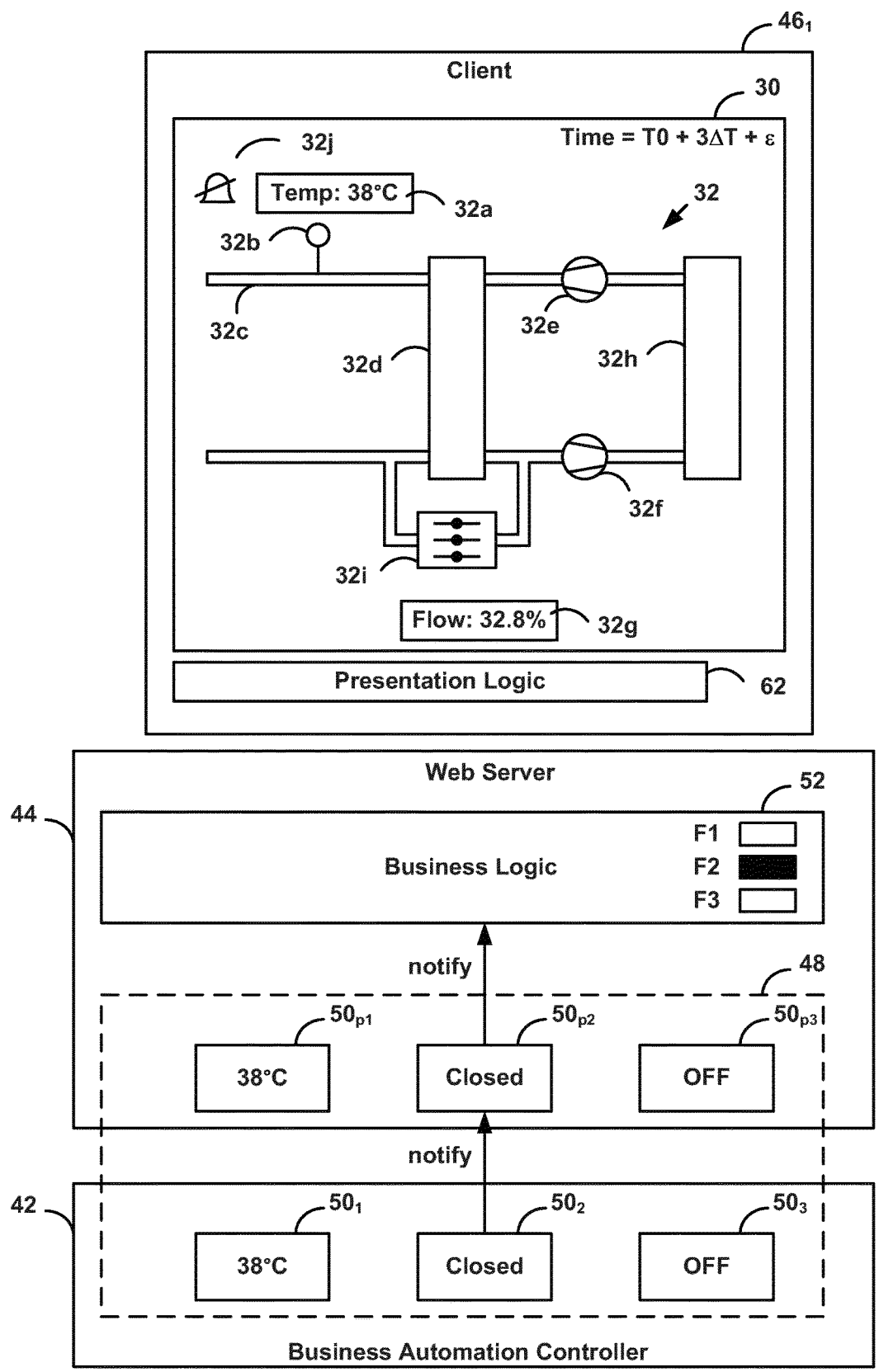

As shown in FIG. 5F, at time $T0+3\Delta t+\epsilon$, where $\epsilon<\Delta t$, proxy object $50_{p2}$ changes from Open to Closed, and proxy objects $50_{p1}$ and $50_{p3}$ remain unchanged from the values they had at time $T0+3\Delta t$. Proxy object $50_{p2}$ provides a model change notification to business logic 52, which changes corresponding flag F2 from the first value to the second value.

Figure 5G:
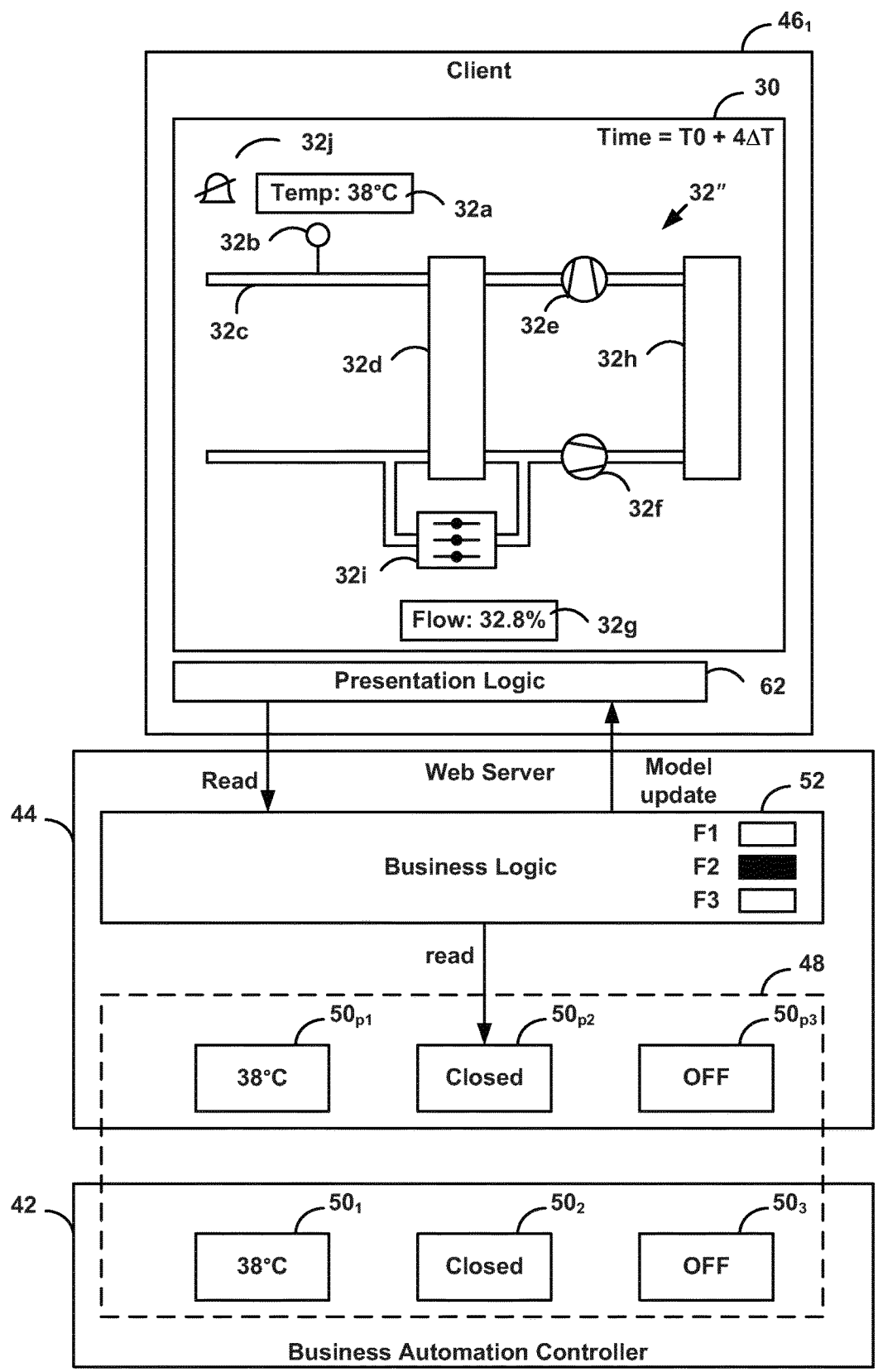

As shown in FIG. 5G, at time $T0+4\Delta t$, in response to a read command from presentation logic 62, business logic 52 checks flags F1-F3. Because flag F2 has the second value, and flags F1 and F3 have the first value, business logic 52 determines that a portion of the model data on client $46_1$ is no longer up-to-date.

Business logic 52 determines that model element 32e corresponds to flag F2, reads the changed values of associated proxy object $50_{p2}$, provides model update instructions to presentation logic 62 only for the changed portions, presentation logic 62 processes the model update instructions to update model 32' to model 32", and then renders the updated model 32" on display device 30. In addition, business logic changes flag F2 from the second value to the first value.

Figure 5H:
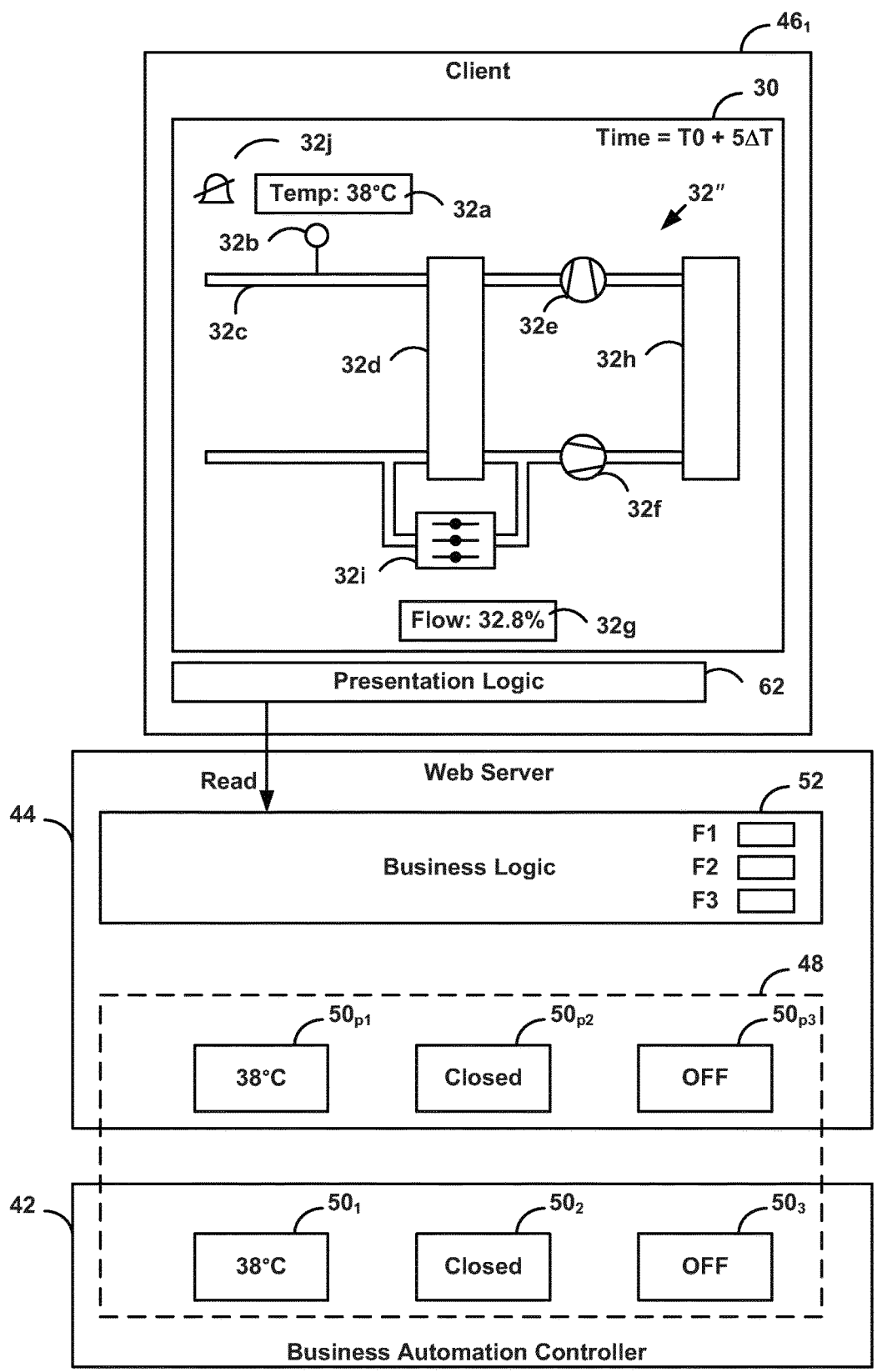

As shown in FIG. 5H, at time $T0+5\Delta t$, proxy objects $50_{p1}$, $50_{p2}$ and $50_{p3}$ have not changed from the values they had at time $T0+4\Delta t$, and flags F1-F3 each have the first value. Thus, in response to a read command from presentation logic 62, business logic 52 checks flags F1-F3. Because F1-F3 all have the first value, the model data on client $46_1$ are up-to-date, and business logic 52 does not need to provide any model data to client $46_1$. Client $46_1$ continues to display model 32".

Figure 5I:
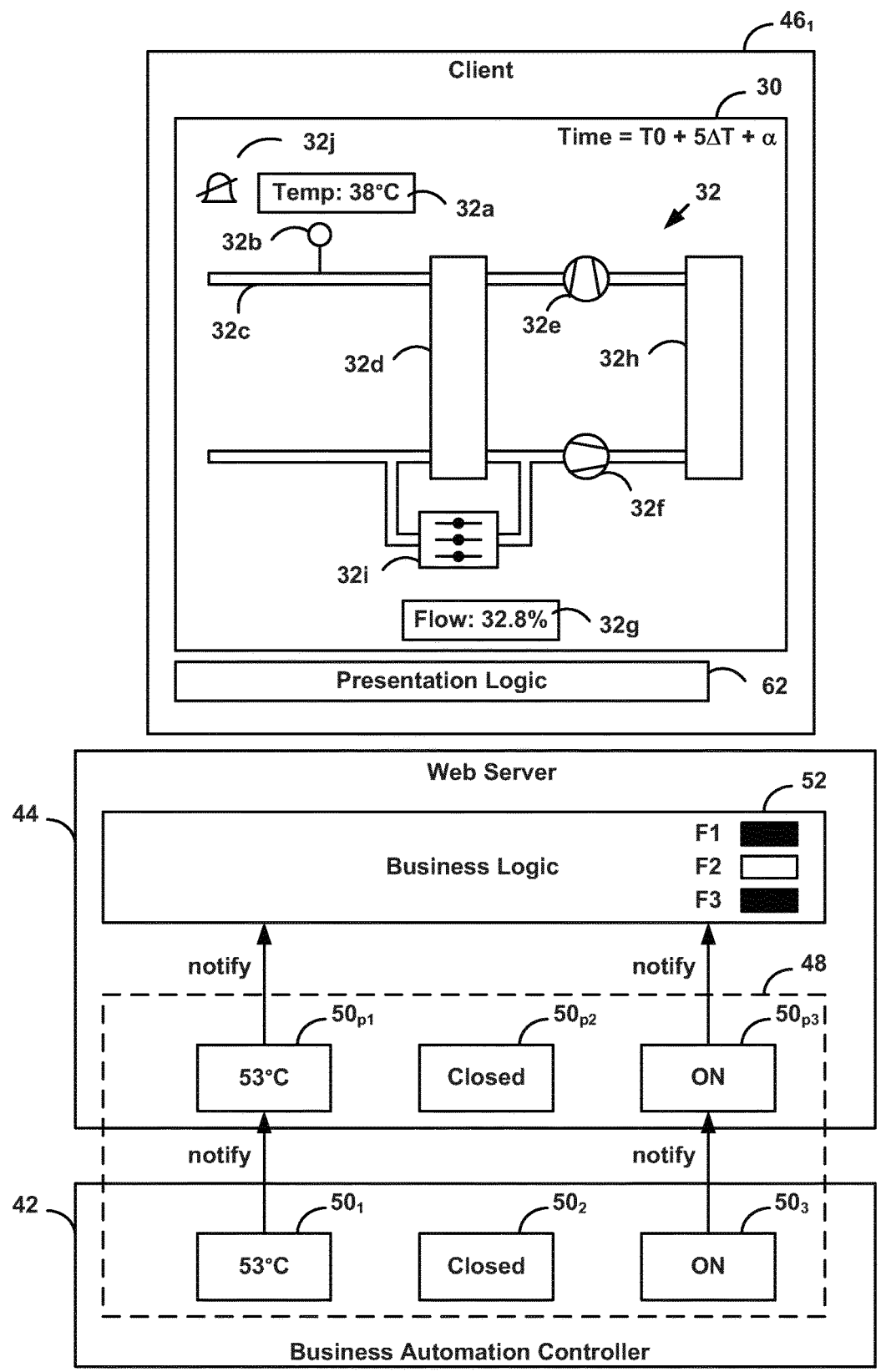

As shown in FIG. 5I, at time $T0+5\Delta t+\alpha$, where $\alpha<\Delta t$, proxy object $50_{p1}$ changes from 38° C. to 53° C., proxy object $50_{p3}$ changes from OFF to ON, and proxy object $50_{p2}$ remains unchanged from the value it had at time $T0+5\Delta t$. Proxy object $50_{p1}$ and $50_{p3}$ each provide a model change notification to business logic 52, which changes corresponding flags F1 and F3, respectively, from the first value to the second value.

Figure 5J:
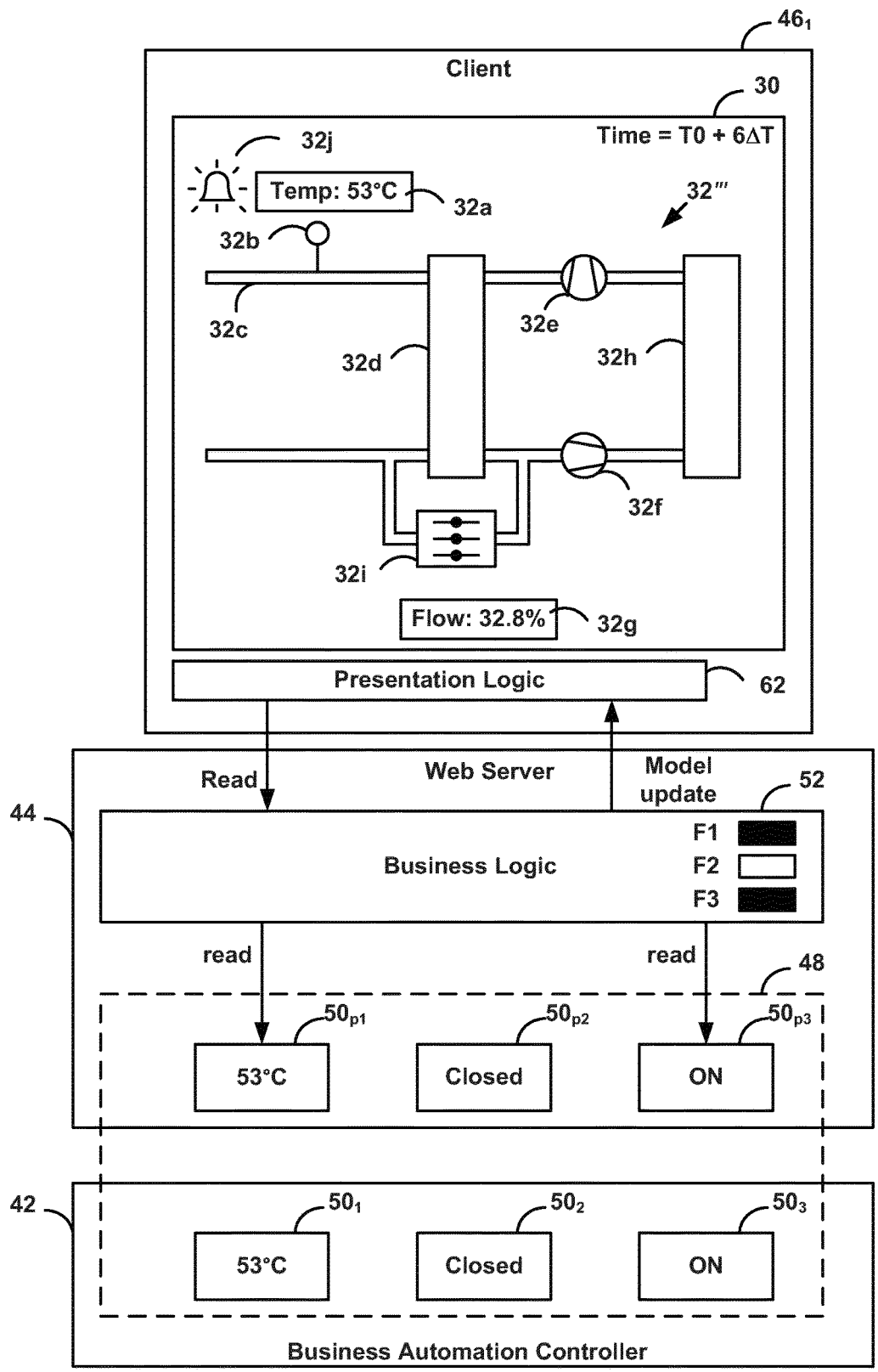

As shown in FIG. 5J, at time $T0+6\Delta t$, in response to a read command from presentation logic 62, business logic 52 checks flags F1-F3. Because flags F1 and F3 have the second value, and flag F2 has the first value, business logic 52 determines that a portion of the model data on client $46_1$ is no longer up-to-date.

Business logic 52 determines that model elements 32a and 32j corresponds to flags F1 and F3, respectively, reads the changed values of associated proxy objects $50_{p1}$ and $50_{p3}$, provides model update instructions to presentation logic 62 only for the changed portions, presentation logic 62 processes the model update instructions to update model 32" to model 32''', and then renders the updated model 32''' on display device 30. In addition, business logic changes flags F1 and F3 from the second value to the first value.

Figure 5K:
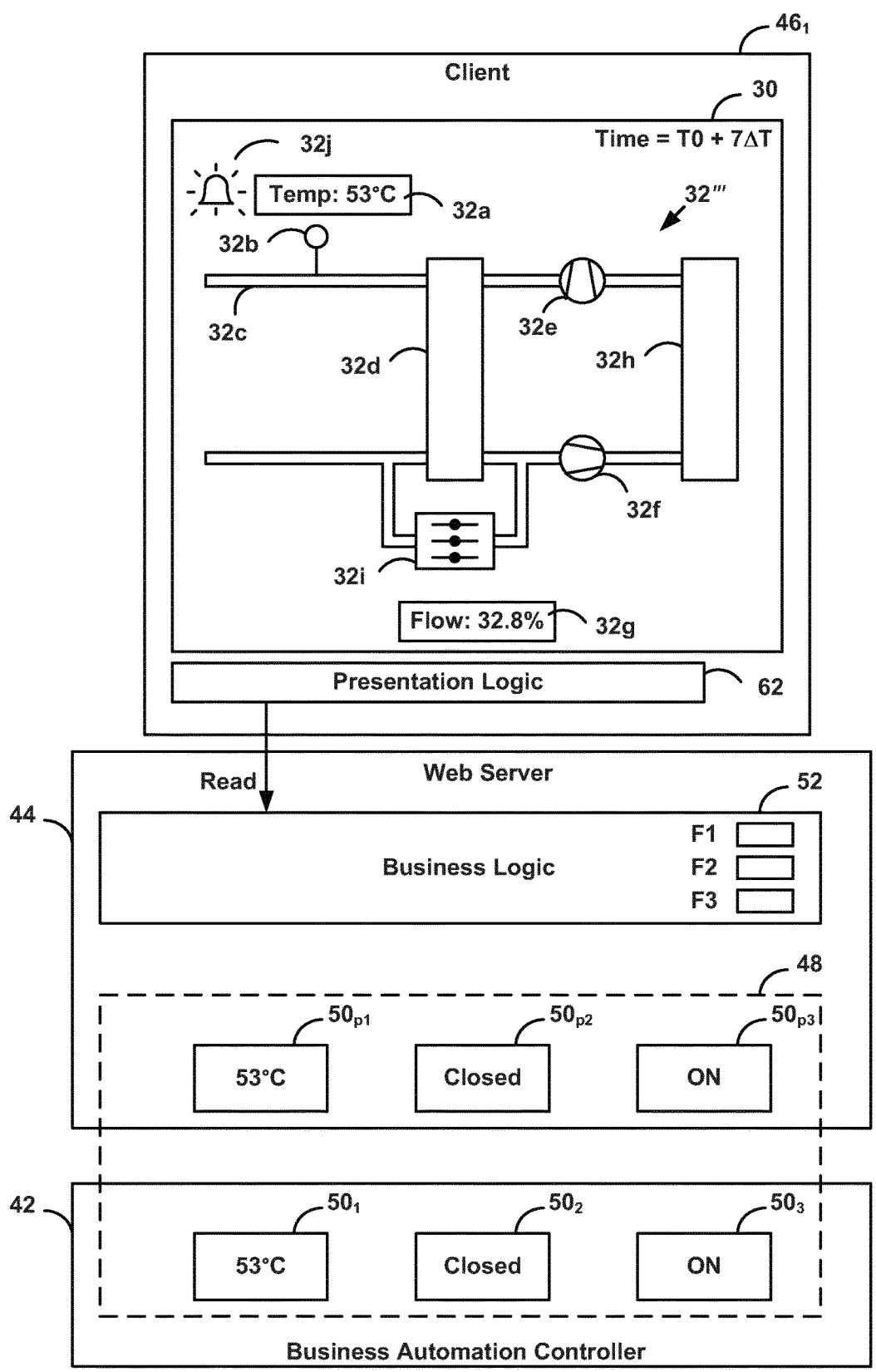

As shown in FIG. 5K, at time $T0+7\Delta t$, proxy objects $50_{p1}$, $50_{p2}$ and $50_{p3}$ have not changed from the values they had at time $T0+6\Delta t$, and flags F1-F3 each have the first value. Thus, in response to a read command from presentation logic 62, business logic 52 checks flags F1-F3. Because F1-F3 all have the first value, the model data on client $46_1$ are up-to-date, and business logic 52 does not need to provide any model data to client $46_1$. Client $46_1$ continues to display model 32'''.

As described above, business logic 52 maintains flags that correspond to model elements to determine if some or all elements of model data on client $46_i$ is no longer up-to-date. In accordance with another example embodiment of this invention, to further simplify model update processing, business logic 52 may maintain flags in a flag hierarchy, and may determine if some or all elements of model data requires updating by scanning the flags in a hierarchical manner.

For example, a model typically is organized in a hierarchy, with the top level corresponding to the entire model, a next lower level corresponding to individual graphics pages, a next lower level corresponding to individual graphics view elements of individual graphics pages, and so on. Thus, flags may be organized hierarchically in accordance with the model hierarchy. Persons of ordinary skill in the art will understand that flag hierarchies in accordance with this invention may be organized in other hierarchical techniques.

Figure 6A:
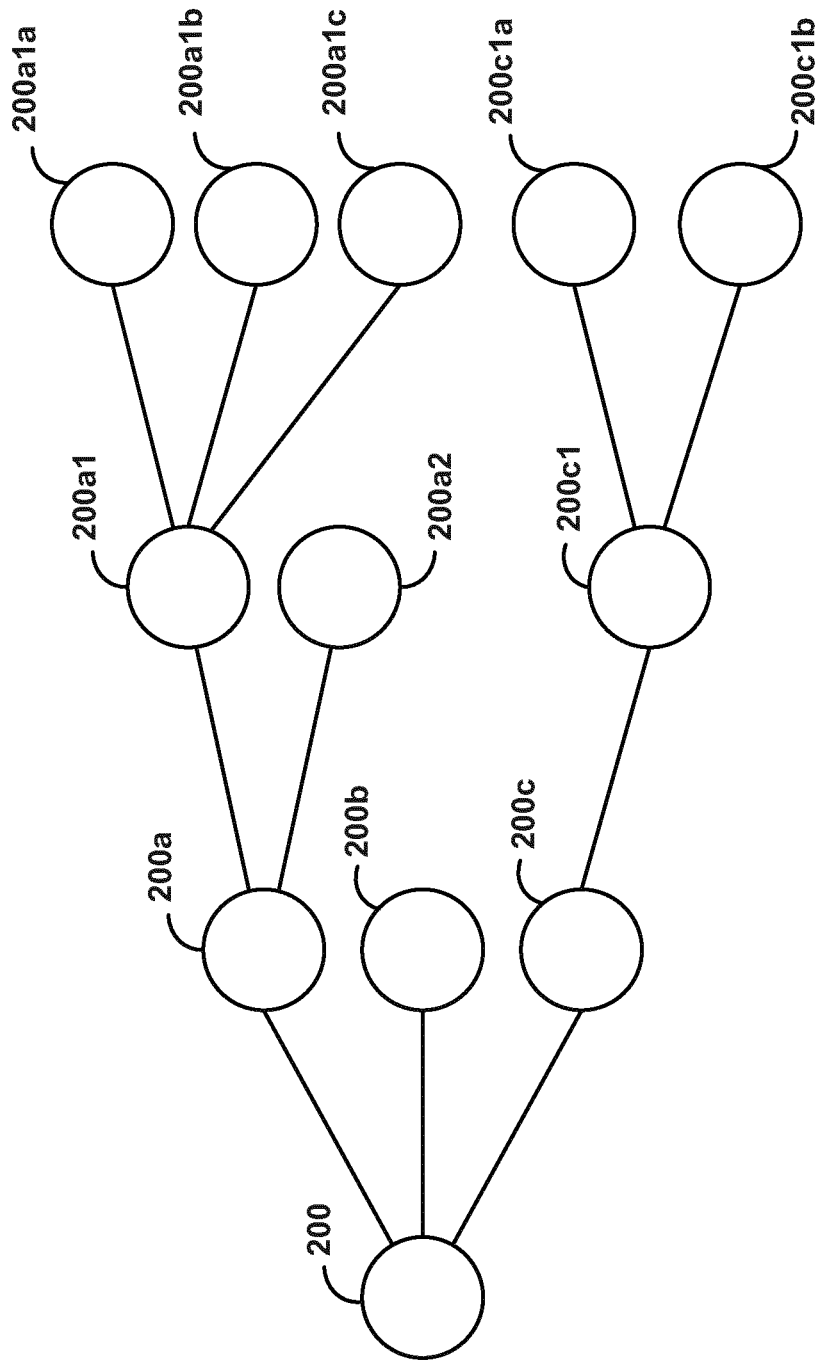
FIGS. 6A-6C are diagrams of example flag hierarchies in accordance with this invention.

Referring now to FIG. 6A, an example flag hierarchy in accordance with this invention is described. In particular, the flag hierarchy includes twelve flags nodes that are arranged in a four-level hierarchy. Flag node 200 is a top level flag, and may correspond to the entire model. A first level includes flag sub-nodes 200a, 200b and 200c that each depend from top level flag node 200. Flag sub-nodes 200a, 200b and 200c may correspond to individual graphics pages of the model.

A second level includes flag sub-nodes 200a1 and 200a2, which depend from flag sub-nodes 200a, and flag 200c1, which depends from flag sub-node 200c. Flag sub-nodes 200a1 and 200a2A each may correspond to graphics view elements of a first page, and flag sub-node 200c1 may correspond to a graphics view element of a second page.

A third level includes flag sub-nodes 200a1a, 200a1b and 200a1c, which depend from flag sub-node 200a1, and flag sub-nodes 200c1a and 200c1b, which depend from flag sub-node 200c1. Flag sub-nodes 200a1a, 200a1b and 200a1c each may correspond to a graphics view sub-element of a first graphics view element, and flag sub-nodes 200c1a and 200c1b each may correspond to a graphics view sub-element of a second graphics view element.

Flag node 200, and flag sub-nodes 200a, 200b, . . . , 200c1b each may have a first value and a second value, as described above. If a flag sub-node has the second value, each higher-order flag node from which the flag sub-node depends also has the second value. Thus, business logic 52 in accordance with this invention may quickly scan the flag hierarchy from top to bottom to determine if any flags have the second value, indicating that some or all elements of the model must be updated.

For example, in the embodiment of FIG. 6A, flag node 200, and flag sub-nodes 200a, 200b, . . . , 200c1b all have the first value. Thus, in response to a read command from presentation logic 62, business logic 52 may check the value of flag node 200 to determine that the entire model is up-to-date. Because flag node 200 has the first value, all flag sub-nodes must have the first value, and thus business logic 52 does not need to check any of flag sub-nodes 200a, 200b, . . . , 200c1b.

Figure 6B:
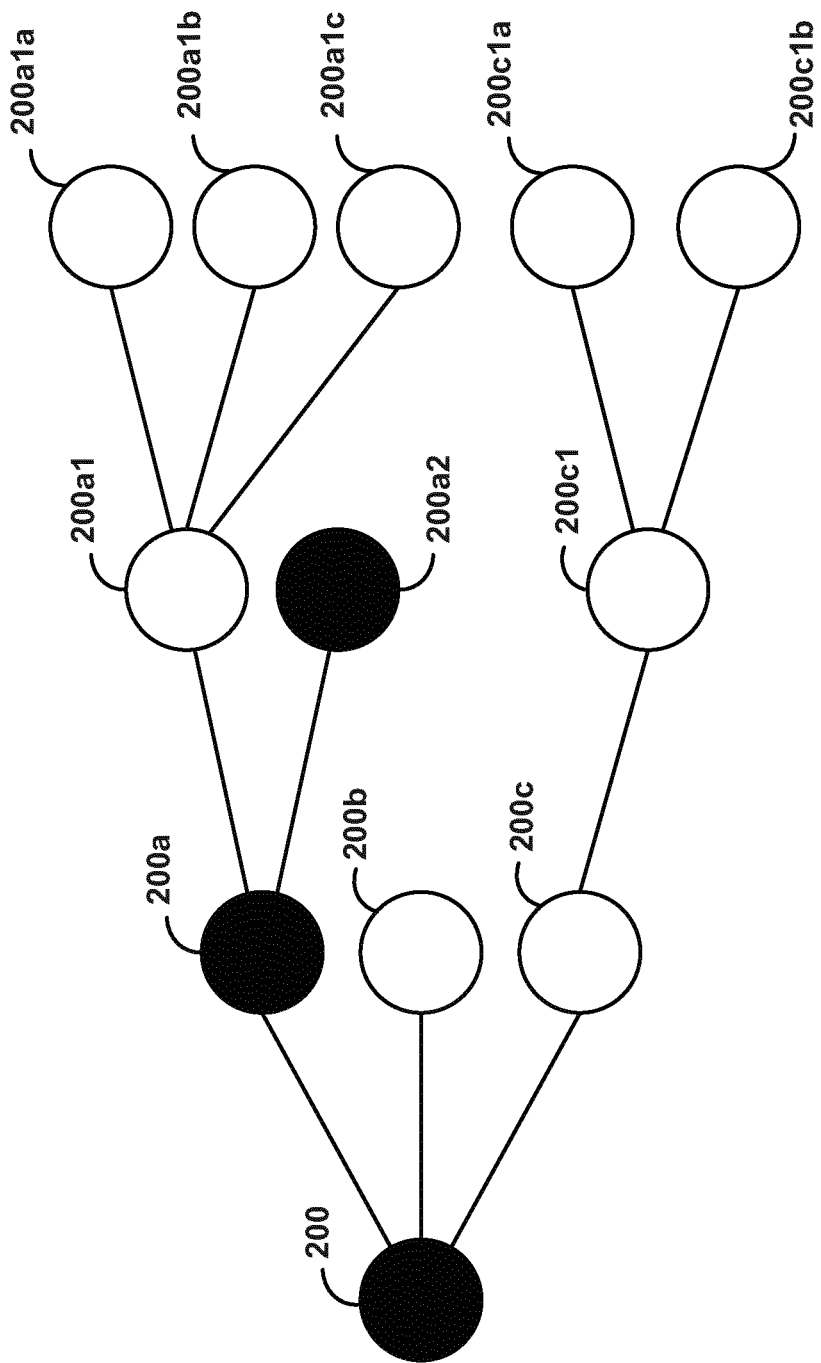

Referring now to FIG. 6B, flag sub-node 200a2 has the second value. Flag sub-node 200a2 depends from flag sub-node 200a, which depends from flag node 200. Accordingly, as described above, flag sub-node 200a and flag node 200 each have the second value. Thus, in response to a read command from presentation logic 62, business logic 52 may check the value of flag node 200 to determine that some portion of the model is no longer up-to-date.

Business logic then checks flag sub-nodes 200a, 200b and 200c. Because flag sub-node 200c has the first value, all flag sub-nodes that depend from flag sub-node 200c must have the first value, and thus business logic 52 does not need to check any of flag sub-nodes 200c1, 200c1a, or 200c1b. Because flag sub-node 200a has the second value, business logic 52 checks flag sub-nodes 200a2 and 200a1. Because flag sub-node 200a1 has the first value, all flag sub-nodes that depend from flag sub-node 200a1 must have the first value, and thus business logic 52 does not need to check any of flag sub-nodes 200a1a, 200a1b, or 200a1c. Thus, rather than checking all eleven flag sub-nodes, business logic 52 may check just five flag sub-nodes to determine that flag sub-nodes 200a2, 200a and 200 have the second value, and all other flag sub-nodes have the first value.

Figure 6C:
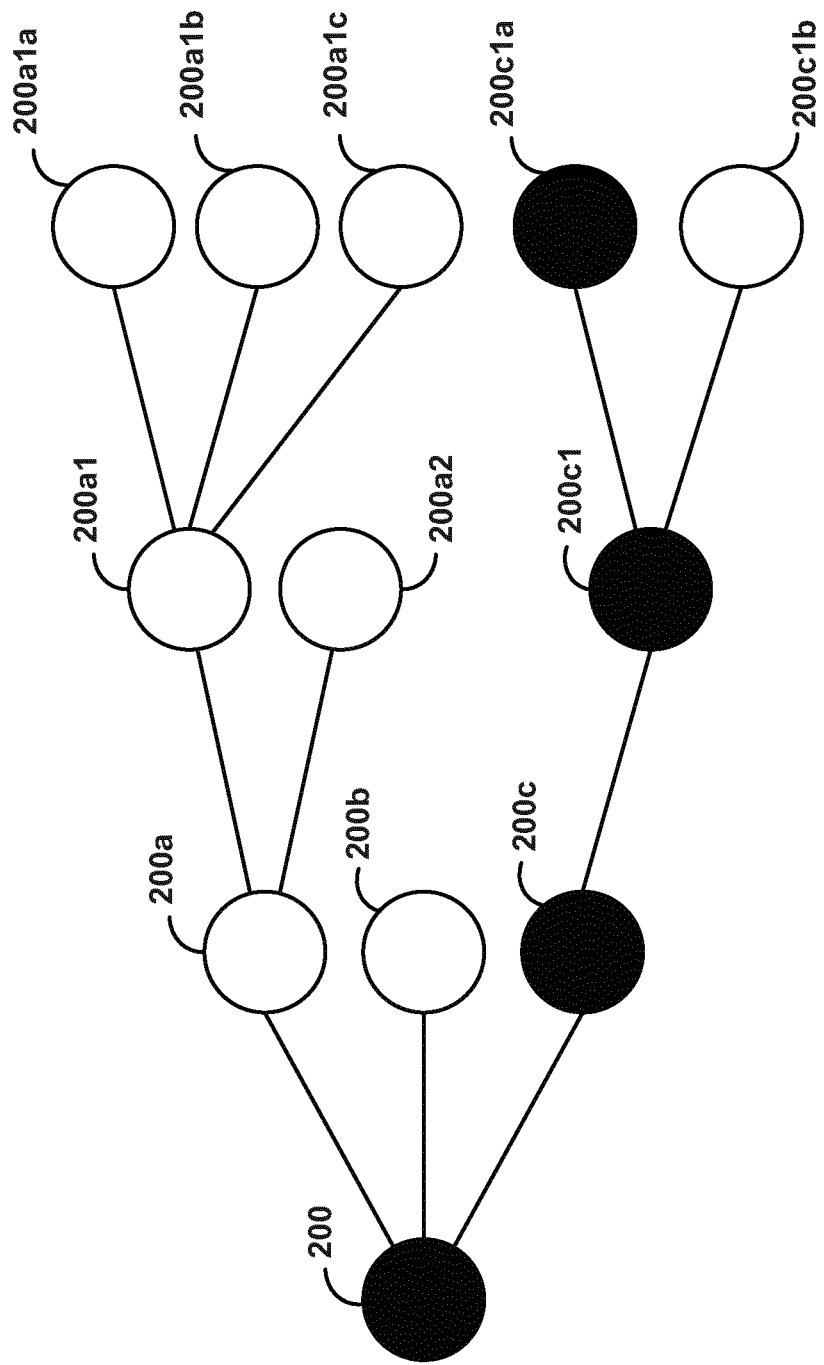

Referring now to FIG. 6C, flag sub-node 200c1a has the second value. Flag sub-node 200c1a depends from flag sub-node 200c1, which depends from flag sub-node 200c, which depends from flag node 200. Accordingly, as described above, flag sub-nodes 200c1, 200c and 200 each have the second value. Thus, in response to a read command from presentation logic 62, business logic 52 may check the value of flag node 200 to determine that some portion of the model is no longer up-to-date.

Business logic then checks flag sub-nodes 200a, 200b and 200c. Because flag sub-nodes 200a and 200b each have the first value, all flag sub-nodes that depend from flag sub-nodes 200a, 200b and 200c must have the first value, and thus business logic 52 does not need to check any of flag sub-nodes 200a1, 200a2, 200a1a, 200a1b, or 200a1c. Because flag sub-node 200c has the second value, business logic 52 checks flag sub-node 200c1. Because flag sub-node 200c1 has the second value, business logic 52 checks flag sub-nodes 200c1a and 200c1c, and determines that flag sub-node 200c1a has the second value. Thus, rather than checking all eleven flag sub-nodes, business logic 52 may check just six flag sub-nodes to determine that flag subnodes 200c1a, 200c1, 200c and flag node 200 have the second value, and all other flags have the first value.

The foregoing merely illustrates the principles of this invention, and various modifications can be made by persons of ordinary skill in the art without departing from the scope and spirit of this invention.

The invention claimed is:

1. A building automation system, comprising:
a building automation controller containing a plurality of building automation objects each having data used for generating a model having a plurality of elements, each of the elements associated with at least one of the building automation objects;
a web server containing business logic adapted to read and subscribe to the building automation objects, each of said building automation objects is adapted to notify the business logic of changes to the data of a building automation object, and to process the data from the building automation objects to provide model update commands based on changed data, said web server implementing an observer pattern to notify the business logic of any changes in data values of the building automation object, the business logic further containing a flag database having a plurality of flags, each of the flags being organized hierarchically in accordance with a model hierarchy and the business logic providing model update commands to the client only for the model elements that require updating as identified by the flags; and
a client containing presentation logic adapted for displaying the model, receive the model update commands from the business logic, update the model using the model update commands, and display an updated model.

2. The building automation system according to claim 1, wherein each of the flags corresponding to an element of the model and has a first value and a second value, wherein the first value indicates that a corresponding element of the model has not changed, and the second value indicates that the corresponding element of the model has changed.

3. The building automation system according to claim 2, wherein in response to a notification of a change from a first building automation object, the business logic determines the element of the model associated with the first building automation object, and changes a value of a flag corresponding to the associated element of the model from the first value to the second value.

4. The building automation system according to claim 3, wherein said client has the presentation logic which periodically issues read commands to the business logic, and in response to the read commands, the business logic determines if any of the flags has the second value.

5. The building automation system according to claim 4, wherein in response to the read commands, the business logic provides the model update commands to the presentation logic only for the elements of the model having the flags with the second value.

6. The building automation system according to claim 2, wherein the first value includes a first color, and the second value includes a second color different from the first color.

7. The building automation system according to claim 3, wherein the model hierarchy includes a flag node and a plurality of flag sub-nodes, wherein each of the flag sub-nodes depends from a higher-order flag node.

8. The building automation system according to claim 7, wherein the flag node corresponds to the model entirely, and a first flag sub-node corresponds to a graphic page of the model.

9. The building automation system according to claim 8, wherein a second flag sub-node depends from the first flag sub-node, and corresponds to a graphic element within the graphic page of the model.

10. The building automation system according to claim 7, wherein when a flag sub-node has the second value, each higher-order flag node from which the flag sub-node depends also has the second value.

11. The building automation system according to claim 10, wherein the business logic is further adapted to scan the model hierarchy of the flag from top to bottom to determine if any of the flag nodes have the second value.

12. A building automation method, which comprises the steps of:
providing a plurality of building automation objects each containing data used for generating a model having a plurality of elements, wherein each of the elements being associated with at least one of the building automation objects;
providing a web server having business logic adapted for reading and subscribing to the building automation objects, each of the building automation objects is adapted to notify the business logic of changes to the data of a building automation object, and to process the data from the building automation objects to provide model update commands based on changed data, the business logic further containing a flag database having a plurality of flags, each of the flags being organized hierarchically in accordance with a model hierarchy;
implementing, via the web server, an observer pattern to notify the business logic of any changes in data values of the building automation object and the business logic providing model update commands to the client only for the model elements that require updating as identified by the flags; and
providing a client having presentation logic adapted to display the model, receive the model update commands from the business logic, update the model using the model update commands, and display an updated model.

13. The method according to claim 12, wherein each of the flags corresponds to an element of the model and has a first value and a second value, wherein the first value indicates that a corresponding element of the model has not changed, and the second value indicates that the corresponding element of the model has changed.

14. The method according to claim 13, wherein in response to a notification of a change from a first building automation object, the business logic determines the element of the model associated with the first building automation object, and changes a value of a flag corresponding to the element from the first value to the second value.

15. The method according to claim 14, wherein the presentation logic periodically issues read commands to the business logic, and in response to the read commands, the business logic determines if any of the flags has the second value.

16. The method according to claim 15, wherein in response to the read commands, the business logic provides the model update commands to the presentation logic only for the elements of the model having corresponding flags that have the second value.

17. The method according to claim 13, wherein the first value has a first color, and the second value has a second color different from the first color.

18. The method of claim 13, wherein the model hierarchy includes a flag node and a plurality of flag sub-nodes, wherein each of the sub-nodes depends from a higher-order flag node.

19. The method according to claim 18, wherein the flag node corresponds to the model entirely, and a first flag sub-node corresponds to a graphic page of the model.

20. The method according to claim 19, wherein a second flag sub-node depends from the first flag sub-node, and corresponds to a graphic element within the graphic page of the model.

21. The method according to claim 18, wherein when a flag sub-node has the second value, each higher-order flag node from which the flag sub-node depends also has the second value.

22. The method according t claim 21, which further comprises adapting the business logic to scan the model hierarchy of the flag from top to bottom to determine if any of the flag nodes have the second value.

* * * * *